United States Patent [19]

Calvignac et al.

[11] Patent Number: 5,119,478
[45] Date of Patent: Jun. 2, 1992

[54] PARALLEL PROCESSING METHOD AND DEVICE FOR RECEIVING AND TRANSMITTING HDLC SDLC BIT STREAMS

[75] Inventors: Jean Calvignac; Jacques Féraud; Bernard Naudin, all of LaGaude; Claude Pin, Nice; Eric Saint-Georges, LaGaude, all of France

[73] Assignee: International Business Machines Corporation, Armonk, N.Y.

[21] Appl. No.: 357,225

[22] Filed: May 26, 1989

[30] Foreign Application Priority Data

Jun. 16, 1988 [EP] European Pat. Off. ............ 88480015

[51] Int. Cl.⁵ ............................................. G06F 5/00
[52] U.S. Cl. ................. 395/200; 364/DIG. 1; 364/DIG. 2; 364/239.3; 364/260.4; 364/932.8; 364/939.2
[58] Field of Search ... 364/200 MS File, 900 MS File; 370/94

[56] References Cited

U.S. PATENT DOCUMENTS 4,071,887  1/1978  Daly et al. ........................ 364/200
4,543,654  9/1985  Jones ................................ 370/94
4,882,727  11/1989  Williams et al. ............... 364/900 X Primary Examiner—Gareth D. Shaw
Assistant Examiner—Brian L. Klock
Attorney, Agent, or Firm—Joscelyn G. Cockburn

[57] ABSTRACT

The bit streams, transporting the frames, received from lines (6) are placed in register 12 in such a way that n bits are processed in parallel during a time interval T. Parallel processor 10 counts the consecutive logical "1" bits beginning at the low order (left most) bit of the n bits received in interval T and from the bits received in the previous interval T−1, to determine when this number is found equal to 5 which bits have to be deleted, and when this number is found equal to 6 whether a flag is received. As a result, it reassembles N-bit characters, with N<n, in register (16). The frame characters to be sent on lines (6) are stored into register (28), and processed in parallel in a time interval T by processor 10 which inserts 0 after five consecutive logical "1's" as a function of the value of the N bit and as a function of the bits of the previous character, to store into register (32), the bits which are sent on lines (6).

11 Claims, 14 Drawing Sheets

| | 530 |
|---|---|
| INSERT "0" AT P7  I7  422-7 | $\overline{P7}$ |
| | SET AT 0 |
| | 427-0 |
| INSERT "0" AT P6  I6  422-6 | AND-OR  532 |
| INSERT "0" AT P5  I5  422-5 | I7.P7 |
| INSERT "0" AT P4  I4  422-4 | + |
| INSERT "0" AT P3  I3  422-3 | I6.P7.$\overline{P6}$ |
| P7  421-7 | + |
| 520 [N] $\overline{P7}$ | I5.P7.$\overline{P6}$.$\overline{P5}$ |
| | + |
| P6  421-6 | I4.P7.$\overline{P6}$.$\overline{P5}$.$\overline{P4}$ |
| 522 [N] $\overline{P6}$ | + |
| | I3.P7.$\overline{P6}$.$\overline{P5}$.$\overline{P4}$.$\overline{P3}$ |
| | SET AT 1 |
| | 427-1 |
| P5  421-5 | AND-OR  534 |
| 524 [N] $\overline{P5}$ | I6.P7.P6 |
| P4  421-4 | + |
| 526 [N] $\overline{P4}$ | I5.P7.P6.$\overline{P5}$ |
| P3  421-3 | + |
| 528 [N] $\overline{P3}$ | I4.P7.P6.$\overline{P5}$.$\overline{P4}$ |
| | + |
| | I3.P7.P6.$\overline{P5}$.$\overline{P4}$.$\overline{P3}$ |
| | SET AT 2 |
| | 427-2 |
| | AND-OR  536 |
| | I4.P7.P6.P5.$\overline{P4}$ |
| | + |
| | I3.P7.P6.P5.$\overline{P4}$.$\overline{P3}$ |
| | SET AT 3 |
| | 427-3 |
| | AND-OR  538 |
| | I4.P7.P6.P5.P4 |
| | + |
| | I3.P7.P6.P5.P4.$\overline{P3}$ |
| | SET AT 4 |
| | 427-4 |
| | AND  540 |
| | P7.P6.P5.P4.P3 |
| | SET AT 5 |
| | 427-5 |

+ = OR
. = AND

PARALLEL PROCESSING METHOD AND DEVICE FOR RECEIVING AND TRANSMITTING HDLC SDLC BIT STREAMS

FIELD OF THE INVENTION

This invention relates to a parallel processing method and a device implementing this method for receiving and transmitting serial HDLC bit streams so as to provide an improved character service function in an information communication system.

BACKGROUND OF THE INVENTION

The synchronous transmission protocols: SDLC (Synchronous Data Link Control) or HDLC (High Level Data Link Control) are bit based protocols which define the structures and rules which govern the synchronous data transmissions.

These protocols are well known and extensively described in the literature.

According to these protocols, the bit stream comprises frames built according to the following fixed scheme:

The frame starts with a flag which has the following pattern 01111110, i.e. it comprises a number f of consecutive bits at a first value, i.e. 6 bits at 1. Then an information block follows, which comprises a variable number of characters including, address, control and data (if any) characters. In this block, a bit at the second value, i.e. 0 is inserted after (f-1) consecutive bits at the first value i.e. after 5 bits at 1, according to the present implementations, to prevent the flag pattern from happening in the information block. In some cases, the frames comprise specific significance patterns such as idle or abort patterns which comprise more than f consecutive bits at the first value, no zeroes are inserted in these patterns.

After the information block, frame check sequence characters are appended (with inserted zeroes) to provide an error detection facility. The frame is ended by a flag which may be used as the starting flag of the next frame.

The Communications controllers or front end processors such as the IBM 3725 or 3745 Communication controllers are attached to HDLC lines through line scanning means. Conventional implementations of the line scanning function of HDLC lines, such as described in U.S. Pat. No. 4,493,051 has taken benefit of this specificity in offering a bit by bit processing of the HDLC bit streams. In the scanning means, which control the scanning of a plurality of lines, a memory area is assigned to each line and comprises a control block to store the information relative to the line. Each processed bit (either a received bit or a bit to be transmitted) is managed separately, which leads to an updating of the control block information for:

zero insertion deletion flag, abort, idle configurations recognition, generation frame check sequence accumulation verification The very high speed transmissions require an efficient implementation of the scanning function, which cannot be reached with the conventional bit by bit processing, the performance of which is limited by the time spent to read and write the control block information. Two memory accesses are needed at each processed bit, since the control block has to be read, updated as a function of the processed bit and the updated information has to be re-written into the control block.

Also, there is another performance limitation due to the path delay of the combinatorial update process of the control blocks.

SUMMARY OF THE INVENTION

An object of the present invention is to provide a method and a device which allow the serial HDLC SDLC bit streams to be processed n-bits by n-bits, which improves the performance of the processing operations of said bit streams.

Another object of the present invention is to provide such a method and device which offer a character service function in an information communication system processing HDLC SDLC bit streams.

The present invention relates to a method and a device implementing this method which allows the bit streams which are serially received or which have to be serially transmitted, to be processed in successive time intervals T, n-bits by n-bits.

The bits streams transport frames which are delimited by flags having a specific bit pattern which comprise a number f of bits at a first value (1) between two bits at a second value (0), and an information bit block in which bits at the second value are inserted after $f-1$ bits at the first value.

A function of the transmitting device is to insert the bit at the second value after ($f-1$) bits at the first value in the information block. A function of the receiving device is to delete the bit at the second value after ($f-1$) bits at the second value to retrieve the information block.

To perform these functions the receiving device implements the method which comprises the following steps:

receiving the incoming bit streams serially and assembling n consecutive bits therefrom to be processed in parallel, in a time interval T, computing the number 1L of consecutive bits at the first value in the n bits from the least recently received bit, computing the number 1R of consecutive bits at the first value in the n bits from the most recently received bit, comparing 1L with n and computing the current number C1(T) of consecutives bits at the first value in the bit stream as follows:

if n > 1L, then C1(T) = 1L + C(T-1) and C(T) = 1R if n = 1L = 1R, then C1(T) = 1L + C(T-1) and
C(T) = C1(T)

where C(T) is the number to be added to 1L in the next time interval (T+1) to compute C1(T+1) and C(T-1) is the number calculated during the previous time interval T, when n is higher than f, checking whether the bits between the most left bit and the most right bit at the second value comprise f or $f-1$ consecutive bits set at the first value to provide specific pattern indications indicative that the n-bits comprise specific information bit patterns comprising more than one bit to be deleted or a flag pattern, determining from the C1(T) and 1L values and from the specific pattern indications if any, at which positions bits at the second value have to be deleted and whether a flag has been received, assembling N-bit characters from the bit received and processed in at least one interval T, with N higher or equal to n.

The transmitting device implements the method which comprises the following steps:

processing the N-bit characters of the frame in successive time intervals, in such a way that in each time interval T, except when a flag is to be processed, a variable number x of bits at the second value are inserted after $f-1$ bits at the first value, as a function of the character bit values and of a count of bits at the first value calculated during the processing of the character in the previous interval, said count being comprised between 0 and $f-1$, depending upon the values of the bits of the character processed during the previous interval, sending a given number n of bits during each time interval T, which comprises $r(T-1)$ residual bits kept from the previous interval $(T-1)$ plus $n(T)$ bits taken from the character processed in this interval such that $r(T-1)+n(T)=n$ and keeping the $r(T)$ bits$=N+x-n(T)$, which overflow the n-bit sending capability, to be sent as residual bits during the next period $T+1$.

The detailed description of the invention will be made assuming that $f=6$, but it will be easy for a man skilled in the art to change the logic circuitry to process frames with different parameters.

BRIEF DESCRIPTION OF THE FIGURES

FIG. 13/shows the updating logic circuit 426 of FIG. 11.

DETAILED DESCRIPTION OF THE INVENTION

The method and device according to the present invention may be used in any information communication system transmitting and receiving serial SDLC HDLC bit streams.

They will be described in details in a preferred embodiment of the invention as implemented in a line scanning means of a communication controller which is connected to a plurality of lines having a transmit and receive capability, through a serial link as described in European Patent Application published on Aug. 19, 1987 under Number 232,437.

According to the teaching of said patent application, each line has a slot offering on the serial link with a specific format which gives the user connected to the line the capability to send and receive a variable number of bits in each slot. The number of valid bits in each slot is indicated through a variable delimiter configuration.

The serial HDLC SDLC bit stream from one user is thus split into the slots assigned to the user on the serial link.

According to the present invention, the valid bits received at each slot are processed in parallel to perform the conventional HDLC SDLC functions, i.e. specific pattern recognition generation and zero deletion, insertion FCS accumulation verification.

Figure 1:
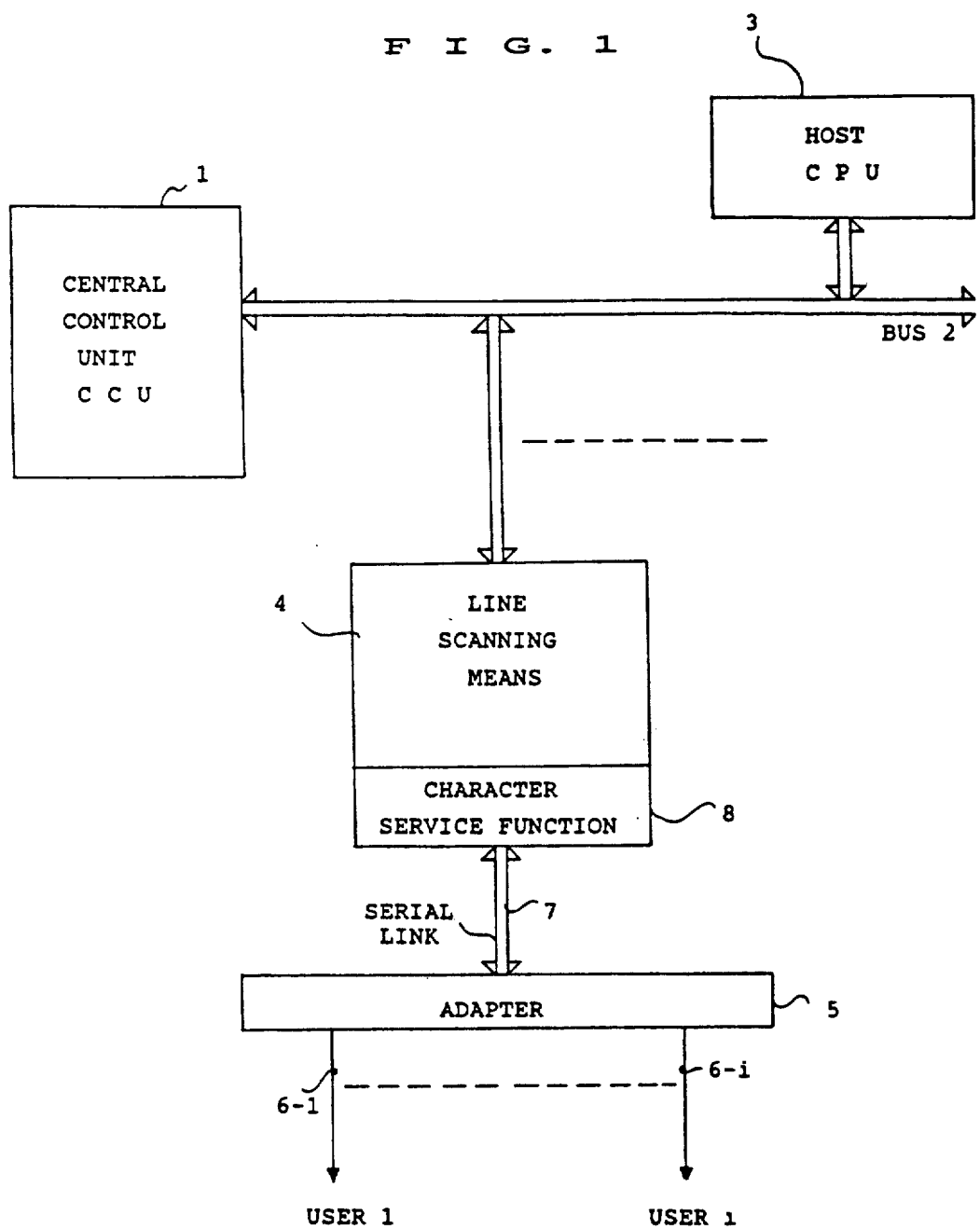
FIG. 1 shows a block diagram of a communication controller wherein the character service function device according to the present invention may be implemented.

FIG. 1 shows a schematic representation of a communication system, comprising a central control unit CCU 1 running a network control program, attached through a bus 2 to at least one central processing unit CPU 3.

The users are attached to the bus 2 through at least one scanning means 4 the function of which is to scan each user line as described in U.S. Pat. No. 4 493 051.

To improve the operation of the line scanning means, the users are connected to the line scanning means 4 through an adapter 5 which makes the interface between the user lines 6-1 to 6-i, and the serial link 7, to adapt the bit stream on the user lines to the specific format on the serial link 7 and vice versa as described in above referenced European Patent Application.

According to the present invention, the line scanning means are provided with a character service function device 8, which receives the HDLC .SDLC bit streams from the user lines and prepares N-bit characters therefrom, which are presented to the upper layer of the scanning means. It also receives the N-bit characters from the upper layer which are transformed into HDLC bit streams to be sent to the user lines.

Figure 2:
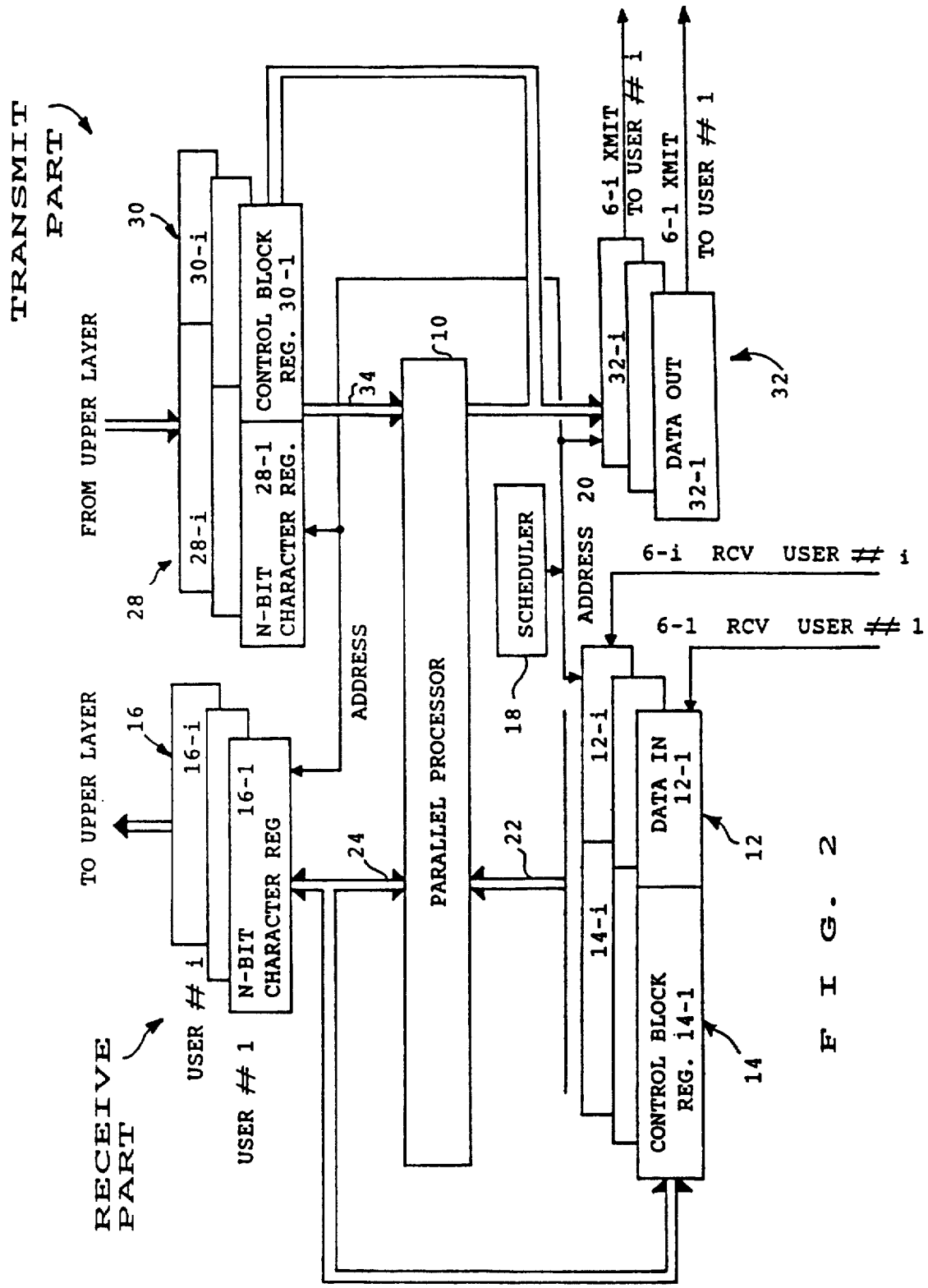
FIG. 2 shows the block diagram of the character service function device 8.

FIG. 2 shows the block diagrams of the receive part and transmit part of the service character function device 8.

The main component of this device is a parallel processor 10 which processes the incoming and outgoing serial bit streams.

The incoming bit streams are received from the receive interfaces of user lines 6-1 RCV to 6-i RCV and the outgoing bit streams are sent on the transmit interfaces of user lines 6-1 XMIT to 6-i XMIT.

The receive part of the device 8 comprises data-in register 12, control block register 14 and N-bit character register 16. Each user line is assigned one position in registers 12, 14 and 16. Scheduler 18 generates the register address on address bus 20 to sequentially address the register positions so as to process the bits received from one selected user.

The data-in bits and control block bits contained in the addressed position of registers 12 and 14 assigned to the selected user are provided to parallel processor 10 through bus 22 to be processed in a time interval T. N-bit characters are generated by parallel processor 10 and provided to the addressed position of register 16 assigned to the selected user, through bus 24. The N-bit characters assembled in register 16 are thus available for the upper layer of the line scanning means 4.

For a receive operation, parallel processor 10 performs the following operations in the time interval T assigned to the processing of n received bits from one user line, for example 6-1 RCV n received bits in data-in register position 12-1 are provided to parallel processor 10 together with the control block bits in register position 14-1. The control block bits comprise residual bits from the previous interval T−1 assigned to the processing of n-bits from said user line. The N-bit character is generated from the received bits during said interval T and potentially from the received bits during the previous interval T−1, T−2, etc. and the parallel processor generates residual bits to be used during the next interval T+1.

The device according to the present invention will be described assuming that the frame parameters are those presently recommended by the Standards Organizations, i.e. f=6, idle pattern comprised of 15 bits at 1 and abort pattern comprised of 7 bits at 1. However it will be easy for the man skilled in the art to modify the logic circuit so as to accomodate different parameters.

The functions of the parallel processor consist in recognizing the specific HDLC SDLC specific patterns: idle and abort which comprise fifteen successive 1. and seven successive 1 respectively and the flag pattern 01111110 which starts a frame. Furthermore it has to delete a zero which follows five successive 1. The operations of the parallel processor will be described later on in reference to its detailed representation.

The transmit part of parallel processor comprises N-bit character register 28, control block register 30 and data-out register 32, each register comprises one position per user line, which is addressed by scheduler 18.

The N-bit characters from the upper layer are stored into register 28 and are provided to parallel processor 10 through bus 34. Processor 10 generates the specific patterns to be sent on user line. and inserts a zero after five consecutive ones, and provides n-bits in register 32 which are sent on user line in an interval T. The residual bits, if any, which may not be sent are written into control block register 30 to be sent during the next time interval T+1.

In FIG. 2, registers 12, 14, 16, 28, 30 and 32 may be built into a Random Access Memory with addressable locations assigned to each user. The scheduler is not described in details, since it is not part of the present invention.

The receive and transmit part of device 8 will now be described in details in reference to FIGS. 3 to 14.

Figure 3:
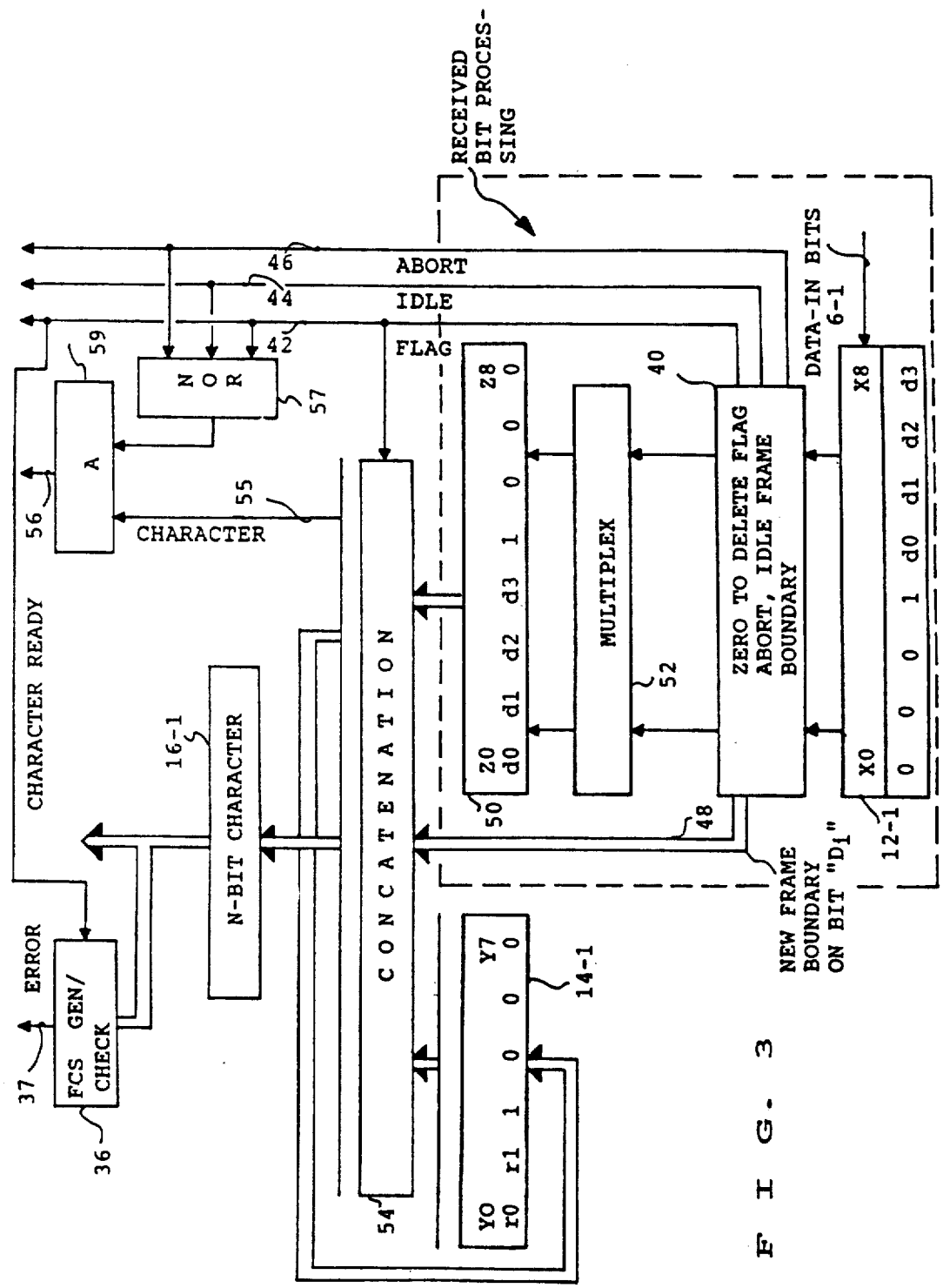
FIG. 3 shows the receive part of the character service function device 8.

As shown in FIG. 3, the bits received from one user, i.e user 1 are inputted into register position 12-1. In a preferred embodiment of the invention, a variable number of bits corresponding to the content of a slot on the serial link 7 (FIG. 1) and described in above referenced European Patent Application are processed during a time interval T, the number v of valid bits is indicated by a variable delimiter. It is assumed in the description that n is equal to N and is lower or equal to 8, but the principle of the present invention may be extended to higher numbers.

The register position assigned to each user comprises nine stages X0 to X8. In FIG. 3, it is assumed that four valid bits d0 to d3 are inputted in register position 12-1, which are delimited by the variable delimiter configuration 0001. In this configuration, the first 1 which follows the most right zeroes delimits the valid bits. So, d0 is the least recently received bit and d3 is the most recently received bit. If there were eight received bits, the register content will be 1 d0 d1 d2 d3 d4 d5 d6 d7 in stages X0 to X8 respectively, the 1 in the left most position being the variable delimiter configuration.

The content of register position 12-1 is provided to logic circuitry 40 which detects the specific configurations flag, idle, abort to generate corresponding indications on lines 42, 44 and 46, detects the zeroes which have to be deleted, and generates on bus 48 an indication of the bit position which begins a frame after a flag, i.e. the new frame boundary on bit "Di" signal.

Multiplex logic circuit 52 provides the received bits after zero deletion to register 50, which comprises nine stages Z0 to Z8, in such a way that the variable delimiter configuration is located at the right of register 50, as shown in FIG. 3, assuming that no zero were to be deleted.

Control block register position 14-1 assigned to user 1, contains residual bits resulting from the processing of bits in the previous time intervals, the number of said residual bits is indicated by a variable delimiter configuration. Two residual bits r0 and r1 are shown in register position 14-1.

Concatenation logic 54 is responsive to the flag indication on line 42. to the new frame boundary signal on line 48 to assemble the N-bit characters.

On the indication New Frame Boundary on bus 48, concatenation logic 54 concatenates valid residual bits (r0, r1) with the new received bits (d0 to d3) at positions which depend upon the new frame boundary indication, and the count d of valid bits is calculated.

If it is equal or higher than 8, character line 55 is raised and the corresponding character bits C0 to C7 are gated into register position 16-1, new residual bits C8 to Cd are stored into control block register position 14-1, if lines flag, idle, abort are not activated. To do so, lines 42, 44 and 46 are provided to NOR circuit 57 which generates a signal on its output line which prevents the character signal from line 55 from being sent on character ready line 56 through AND gate 59.

If d is lower than 8, bits C0 to Cd are stored into control block register 14-1.

This process will be described in details later on.

Circuit 36, which may be located in the upper layer of circuit 4, is responsive to the flag signal on line 42 and to the content of register 16-1 to accumulate the FCS value and checks it so as to provide an error signal on lines 37 when the frame is found in error.

Circuits 40, 50, 52 and 54 comprise the receive part of the parallel processor 10.

Figure 4:
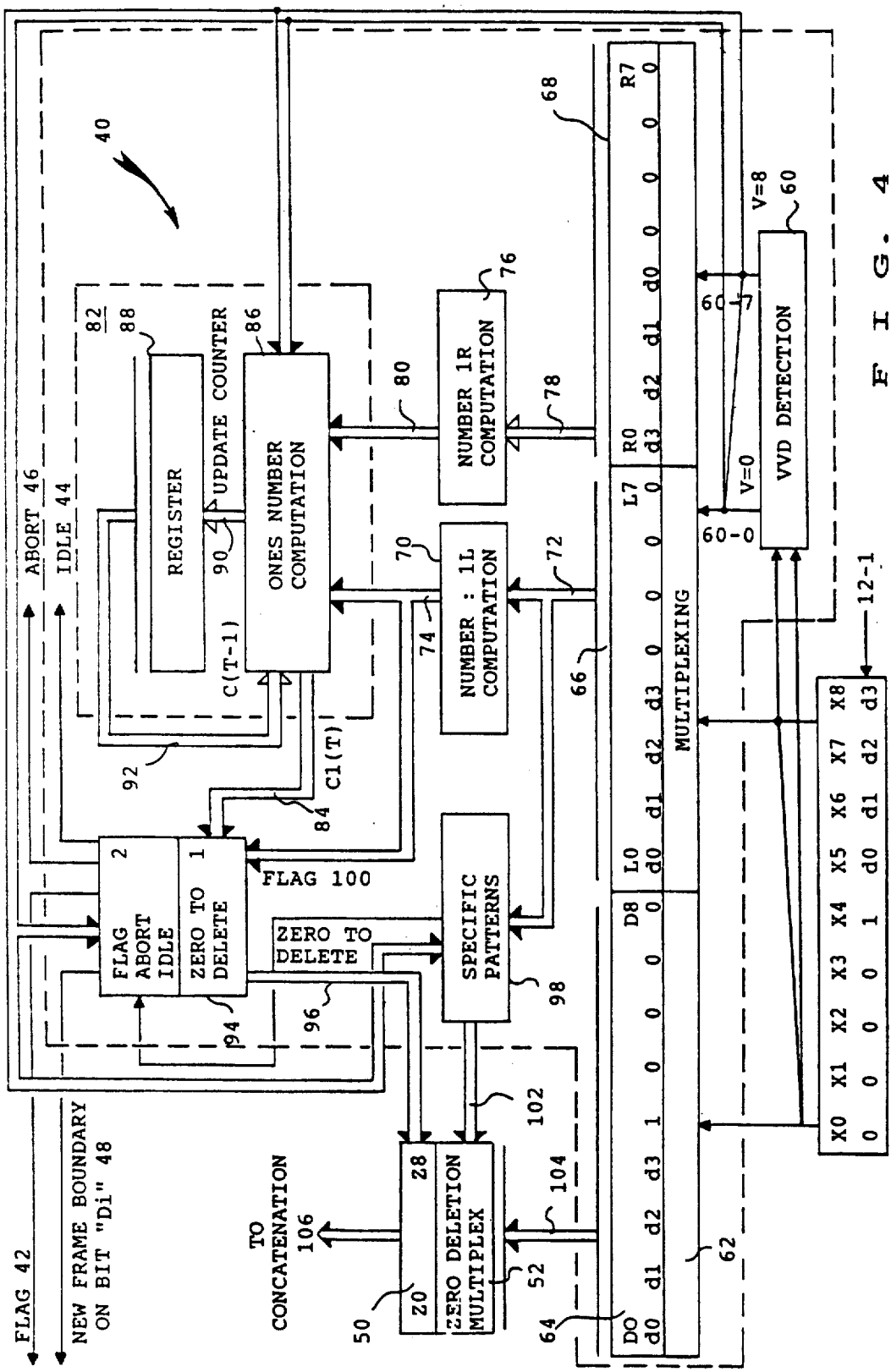
FIG. 4 shows the detailed representation of circuit 40 of FIG. 3 to generate the "zero to delete"; flag, idle, abort, new frame boundary signals.

FIG. 4 shows the detailed representation of logic circuit 40 and 52.

Circuit 40, comprises variable delimiter detection circuit 60 which is responsive to the content of addressed register position i.e. 12-1, to provide on one of its nine output lines 60-0 to 60-8, an active signal indicative of the number of valid bits in register position 12-1, which depends upon the variable delimiter configuration. For example, a signal on line 60-4 indicates that there are V=4 valid bits which will be processed in parallel according to the present invention.

The content of register position 12-1 is provided to multiplexing circuit 62 which arranges the received bits and generates three configurations.

The configuration in register 64 which comprises nine stage D0 to D8, comprises the valid data bits with the least recently received bit d0 in the left most stage, and the variable delimiter configuration in the right stages, this is done as a function of the valid bit number V according to the following table 1:

TABLE 1

|     | D0 | D1 | D2 | D3 | D4 | D5 | D6 | D7 | D8 |
|---|---|---|---|---|---|---|---|---|---|
| V = 0 | X8 | 0 | 0 | 0 | 0 | 0 | 0 | 0 | 0 |
| V = 1 | X8 | X7 | 0 | 0 | 0 | 0 | 0 | 0 | 0 |
| V = 2 | X7 | X8 | X6 | 0 | 0 | 0 | 0 | 0 | 0 |
| V = 3 | X6 | X7 | X8 | X5 | 0 | 0 | 0 | 0 | 0 |
| V = 4 | X5 | X6 | X7 | X8 | X4 | 0 | 0 | 0 | 0 |
|       | (d0) | (d1) | (d2) | (d3) | 1 | 0 | 0 | 0 | 0 |
| V = 5 | X4 | X5 | X6 | X7 | X8 | X3 | 0 | 0 | 0 |
| V = 6 | X3 | X4 | X5 | X6 | X7 | X8 | X2 | 0 | 0 |
| V = 7 | X2 | X3 | X4 | X5 | X6 | X7 | X8 | X1 | 0 |
| V = 8 | X1 | X2 | X3 | X4 | X5 | X6 | X7 | X8 | X0 |
|       | (d0) | (d1) | (d2) | (d3) | (d4) | (d5) | (d6) | (d7) | 1 |

The configuration in register 66, which comprises eight stage L0 to L7, comprises the valid data bits with the least recently bit in the left most position, with zeroes padded on the right, this is done as a function of the valid data bit number V, according to the following table 2:

TABLE 2

|     | L0 | L1 | L2 | L3 | L4 | L5 | L6 | L7 |
|---|---|---|---|---|---|---|---|---|
| V = 0 | 0 | 0 | 0 | 0 | 0 | 0 | 0 | 0 |
| V = 1 | X8 | 0 | 0 | 0 | 0 | 0 | 0 | 0 |
| V = 2 | X7 | X8 | 0 | 0 | 0 | 0 | 0 | 0 |
| V = 3 | X6 | X7 | X8 | 0 | 0 | 0 | 0 | 0 |
| V = 4 | X5 | X6 | X7 | X8 | 0 | 0 | 0 | 0 |
| V = 5 | X4 | X5 | X6 | X7 | X8 | 0 | 0 | 0 |
|       | (d0) | (d1) | (d2) | (d3) | 0 | 0 | 0 | 0 |
| V = 6 | X3 | X4 | X5 | X6 | X7 | X8 | 0 | 0 |
| V = 7 | X2 | X3 | X4 | X5 | X6 | X7 | X8 | 0 |
| V = 8 | X1 | X2 | X3 | X4 | X5 | X6 | X7 | X8 |
|       | (d0) | (d1) | (d2) | (d3) | (d4) | (d5) | (d6) | (d7) |

The configuration in register 68, which comprises eight stage R0 to R7, comprises the valid data bits with the most recently bit in the left most position, with zeroes padded on the right, this is done as a function of the valid data bit number V, according to the following table 3:

TABLE 3

|     | R0 | R1 | R2 | R3 | R4 | R5 | R6 | R7 |
|---|---|---|---|---|---|---|---|---|
| V = 0 | 0 | 0 | 0 | 0 | 0 | 0 | 0 | 0 |
| V = 1 | X8 | 0 | 0 | 0 | 0 | 0 | 0 | 0 |
| V = 2 | X8 | X7 | 0 | 0 | 0 | 0 | 0 | 0 |
| V = 3 | X8 | X7 | X6 | 0 | 0 | 0 | 0 | 0 |
| V = 4 | X8 | X7 | X6 | X5 | 0 | 0 | 0 | 0 |
| V = 5 | X8 | X7 | X6 | X5 | X4 | 0 | 0 | 0 |
| V = 6 | X8 | X7 | X6 | X5 | X4 | X3 | 0 | 0 |
| V = 7 | X8 | X7 | X6 | X5 | X4 | X3 | X2 | 0 |
| V = 8 | X8 | X7 | X6 | X5 | X4 | X3 | X2 | X1 |
|       | (d7) | (d6) | (d5) | (d4) | (d3) | (d2) | (d1) | (d0) |

The configuration in register 66 is provided to logic circuit 70 through bus 72. Circuit 70 provides an indication on one of its eight output lines comprising bus 74 of the number 1L of 1 from the least recently received bit and the first 0 among the valid bits (1L stands for "1 on the left").

Figure 7:
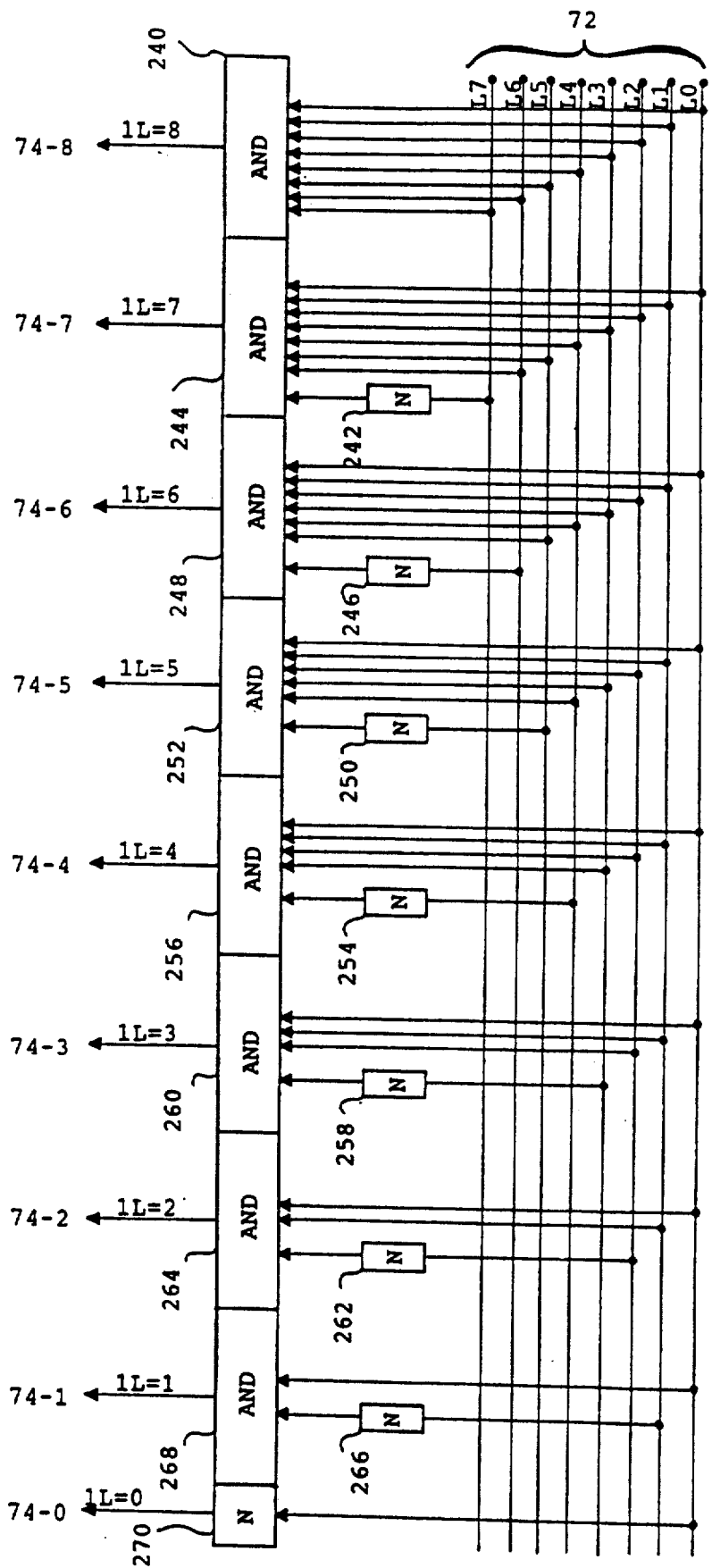
FIG. 7 shows a logic circuit which may be used as circuit 70 for computing the number IL.

The configuration in register 66 allows this indication to be provided through a simple logic circuit as shown in FIG. 7.

The configuration in register 68 is provided to logic circuit 76 through bus 78. Circuit 76 provides an indication on one of its eight output lines comprising bus 80 of the number 1R of 1 from the most recently received bit and the first 0 among the valid bits (1R stands for "1 on the right").

The configuration in register 68 allows this indication to be provided through a logic circuit which is identical to the circuit shown in FIG. 7.

Circuit 82 generates on bus 84 the number of consecutive 1, C1(T) in the bit stream, which is calculated in time interval T, as a function of the received bits and taking into account the previous received bits. Circuit 82 comprises ones number computation logic circuit 86 and register 88 which is updated during each time interval T with a new value C(T) to be used for the computation of C1(T+1) during the next time interval T+1.

Circuit 82 implements the process according to the present invention in the following way.

Circuit 86 compares 1L with V.

If V = 1L then C1(T) is made equal to C(T−1)+1L, where C(T−1) is the value stored into register 88 during the previous time interval (T−1), and the register is updated with C(T)=C1(T).

If V > 1L then C1(T) is made equal to C(T−1)+1L, and register 88 is updated with C(T)=1R.

Thus, the number C1(T) provides an indication of the number of consecutive 1 in the bit stream comprising the bits received in the interval T. This number is tested within circuit 94. If it is found equal to 15, IDLE line is activated, if it is found equal to 7, ABORT line 46 is activated and if it is found equal to 6, FLAG line is activated and the indication of the NEW FRAME BOUNDARY on bit "Di" is provided on bus 48.

Also, C1(T)=5 means that the 0 which follows five consecutive 1 is to be deleted, and the position of the 0 to be deleted which depends upon the number 1l, is indicated on one line of bus 96.

In addition, since it may happen when V=7 and V=8 that specific patterns are received in a time interval T, such as the flag pattern 01111110 or specific patterns wherein two 0 have to be deleted, such as 0111110x or x0111110, (where x means don't care) the content of register 66 is provided to specific pattern recognition circuit 98 which generates either a flag indication on line 100 which is provided to circuit 94 to be ORED with the flag indication resulting from the test of C1(T) or an indication of a second zero to delete on D6 or D7 which is provided to zero deletion multiplex circuit 52 through bus 102.

The content of register 64 is provided to multiplex circuit 52 through bus 104, which gates the appropriate bit configuration in register 50 as a function of the zero to delete indications on busses 96 and 102.

Table 4 shows specific examples of the shifting operations performed through circuit 52, for the different values of V, when the indication on bus 96 is "zero to delete D0" and on bus 102 "zero to delete D6".

TABLE 4

|  | V | Z0 | Z1 | Z2 | Z3 | Z4 | Z5 | Z6 | Z7 | Z8 |
|---|---|---|---|---|---|---|---|---|---|---|
| Delete D0 | 0 | 1 | 0 | 0 | 0 | 0 | 0 | 0 | 0 | 0 |
|  | 1 | 1 | 0 | 0 | 0 | 0 | 0 | 0 | 0 | 0 |
|  | 2 | D1 | 1 | 0 | 0 | 0 | 0 | 0 | 0 | 0 |
|  | 3 | D1 | D2 | 1 | 0 | 0 | 0 | 0 | 0 | 0 |
|  | 4 | D1 | D2 | D3 | 1 | 0 | 0 | 0 | 0 | 0 |
|  | 5 | D1 | D2 | D3 | D4 | 1 | 0 | 0 | 0 | 0 |
|  | 6 | D1 | D2 | D3 | D4 | D5 | 0 | 0 | 0 | 0 |
| Delete | 7 | D1 | D2 | D3 | D4 | D5 | 1 | 0 | 0 | 0 |

TABLE 4-continued

| | V | Z0 | Z1 | Z2 | Z3 | Z4 | Z5 | Z6 | Z7 | Z8 |
|---|---|---|---|---|---|---|---|---|---|---|
| D0. D7 | 8 | D1 | D2 | D3 | D4 | D5 | D7 | 1 | 0 | 0 |

The content of register 50, in which the number z of valid bits is indicated by a delimiter variable configuration at the right of the valid bits, is provided to the concatenation logic 54 through bus 106.

Figure 5:
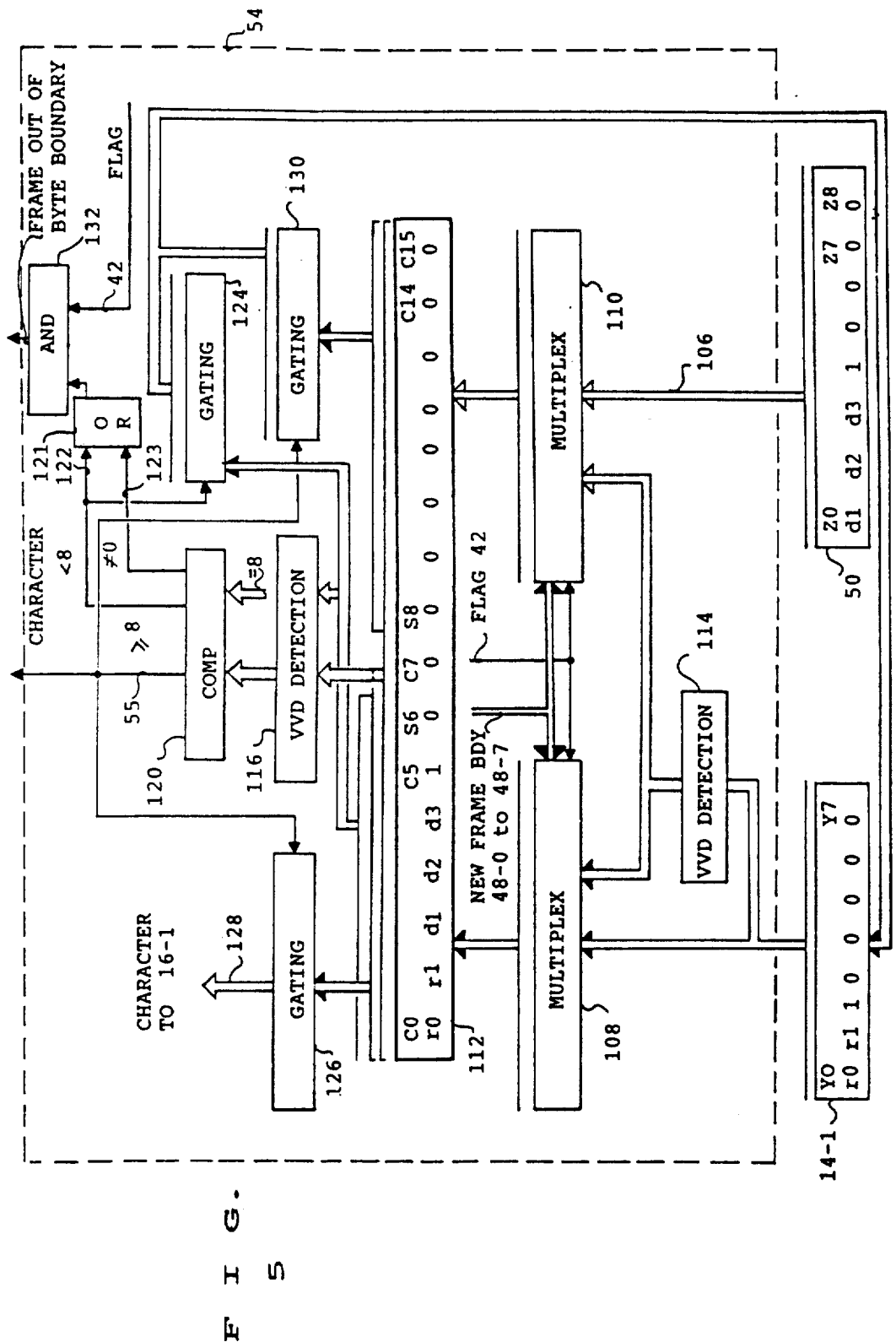
FIG. 5 shows the detailed representation of concatenation logic circuit 54 of FIG. 3.

Concatenation logic 54 is shown in FIG. 5. The residual bits from the previous processing time interval (T−1) in register position 14-1 and the content of register 50 are provided to two multiplex circuits 108 and 110 which gates the content of register position 14-1 and of register 50 in given positions of register 112 as a function of the number of valid residual bits indicated by the variable delimiter configuration on the right of register position and detected by variable delimiter detector 114, the flag indication on line 42 and the new frame boundary on bit Di signal on bus 48.

For example, assuming that the flag line 42, is inactive, that there were two valid residual bits r1 and r2 in register position 14-1 as indicated by the 100000 variable delimiter, and that the content of register 50 is d1 d2 d3 1 0 0 0 0, the content of register 112 which comprises eighteen stages C0 to C15 will be r0 r1 d1 d2 d3 1 0 0 0 0 0 0 0 0 0, as shown in FIG. 5. Variable delimiter circuit 116 tests the number d of valid bits in register 112, (in this specific case it found five valid bits) which is compared to 8 in comparator 120.

If d is found lower than 8, output line 122 of comparator 120 is activated, this line is provided to gating circuit 124 which causes the bits contained in stages C0 to C7 of register 112 to be written into register position 14-1 to be used as residual bits during the next time interval T+1. Since these stages contain the variable delimiter pattern, this pattern is written into register position 14-1 and may be used to calculate the number of valid residual bits.

If d is found higher or equal to 8, output line 55 is activated which indicates that a character is ready to be sent to the upper layer, in character register position. This line 55 is provided to gating circuit 126 through AND gate 59 (FIG. 3) which thus, may transfer the character bits in stages C0 to C7 to register position 16-1 through bus 128. This line is also provided to gating circuit 130 which transfers the residual bits and variable delimiter pattern in stages C8 to C15 into register position 14-1.

If a flag signal is received on line 42, the flag bits should not be sent to the upper layer, and the first bits 20 FR 9 88 005 of the new received frame as indicated by the signal on one of bus lines 48 are transferred to register 112.

If the flag signal is activated with d different from 0 or 8, an error is reported which means "frame out of byte boundary". This signal is generated by AND gate 132 which is conditioned by the flag signal on line 42 by the signal at the output of OR gate 121 which is activated by the active signal on line 122, and by an active signal on output line 123, of comparator 120, when d=0.

Figure 6:
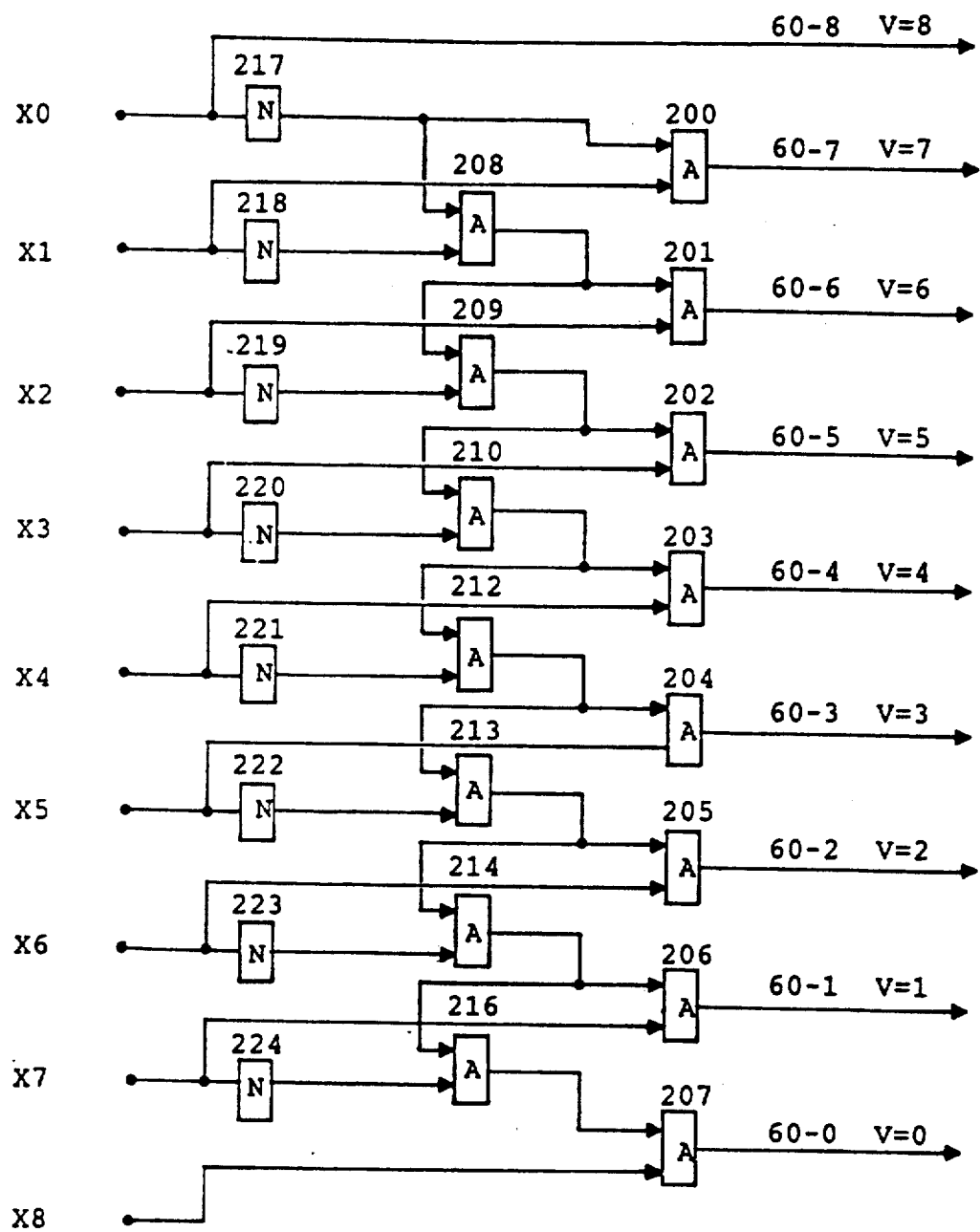
FIG. 6 shows a variable delimiter detection circuit which may be used as circuit 60 in FIG. 4.

FIG. 6 shows the details of a logic circuit which may be used as circuit 60 to generate the indication of the number V of valid bits. Circuits 116 and 114 may be built using the same principle to generate the indication of the number R of valid residual bits and the number d of valid bits in register 112.

Circuit 60 comprises eight AND gates 200 to 207 which provide on their output lines 60-0 to 60-7 the indications V=0 to V=7, the indication V=8 is directly generated from the value of X0. Circuit 60 also comprises AND gates 208 to 216. The output lines of AND gates 208 to 216 are connected to the first inputs of AND gates 201 to 207 respectively. The second inputs of AND gates 201 to 207 receive the bits contained in X2 to X8 respectively.

The bits contained in X0 to X7 are inverted through inverters 217 to 224. The output line of inverter 217 is connected to the first input of AND gate 200, the second input of which receives the bit contained in X1, so that AND gate 200 provides on its output line the indication V=7.

The output lines of inverters 217 and 218 are provided to AND gate 208, which provides an active signal on its output line when X0 and X1 are at 0, so that AND gate 201 provides an active signal if X2 is at 1, indicative of V=6 valid bits.

The output lines of inverters 219 to 224 are connected to the first inputs of AND gates 209 to 216, the second inputs of which are connected to the output lines of AND gates 208 to 214.

Thus, the output lines of AND gates 202 to 207 provide the indication V=5 to V=0, respectively.

FIG. 7 shows the logic circuit 70 for computing the number 1l, from the content of register 66 provided on bus 72. A similar logic circuit may be used for computing the number 1R from the content of register 68, due to the rearrangement of the valid bit configuration in register 68.

The bits contained in stages L0 to L7 of register 66 are provided to AND gate 240, which thus provides an active output signal on line 74-8 when 1L=8.

The bits contained in stages L0 to L6 and the bit contained in L7 inverted by inverter 242 are provided to AND gate 244, which thus provides an active output signal on line 74-7 when 1L=7.

The bits contained in L0 to L5 and the bit contained in L6 inverted by inverter 246 are provided to AND gate 248, which thus provides an active output signal on line 74-6 when 1L=6.

The bits contained in L0 to L4 and the bit contained in L5 inverted by inverter 250 are provided to AND gate 252, which thus provides an active output signal on line 74-5 when 1L=5.

The bits contained in L0 to L3 and the bit contained in L4 inverted by inverter 254 are provided to AND gate 256, which thus provides and active output signal on line 74-4 when 1L=4.

The bits contained in L0 to L2 and the bit contained in L3 inverted by inverter 258 are provided to AND gate 260, which thus provides an active output signal on line 74-3 when 1L=3.

The bits contained in L0 to L1 and the bit contained in L2 inverted by inverter 262 are provided to AND gate 264, which thus provides an active output signal on line 74-2 when 1L=2.

The bits contained in L0 and the bit contained in L1 inverted by inverter 266 are provided to AND gate 268, which thus provides and active output signal on line 74-1 when 1L=1.

The bit contained in L0 is provided to inverter 270 which generates an active signal on its output line 74-0 when 1L=0.

Figure 8:
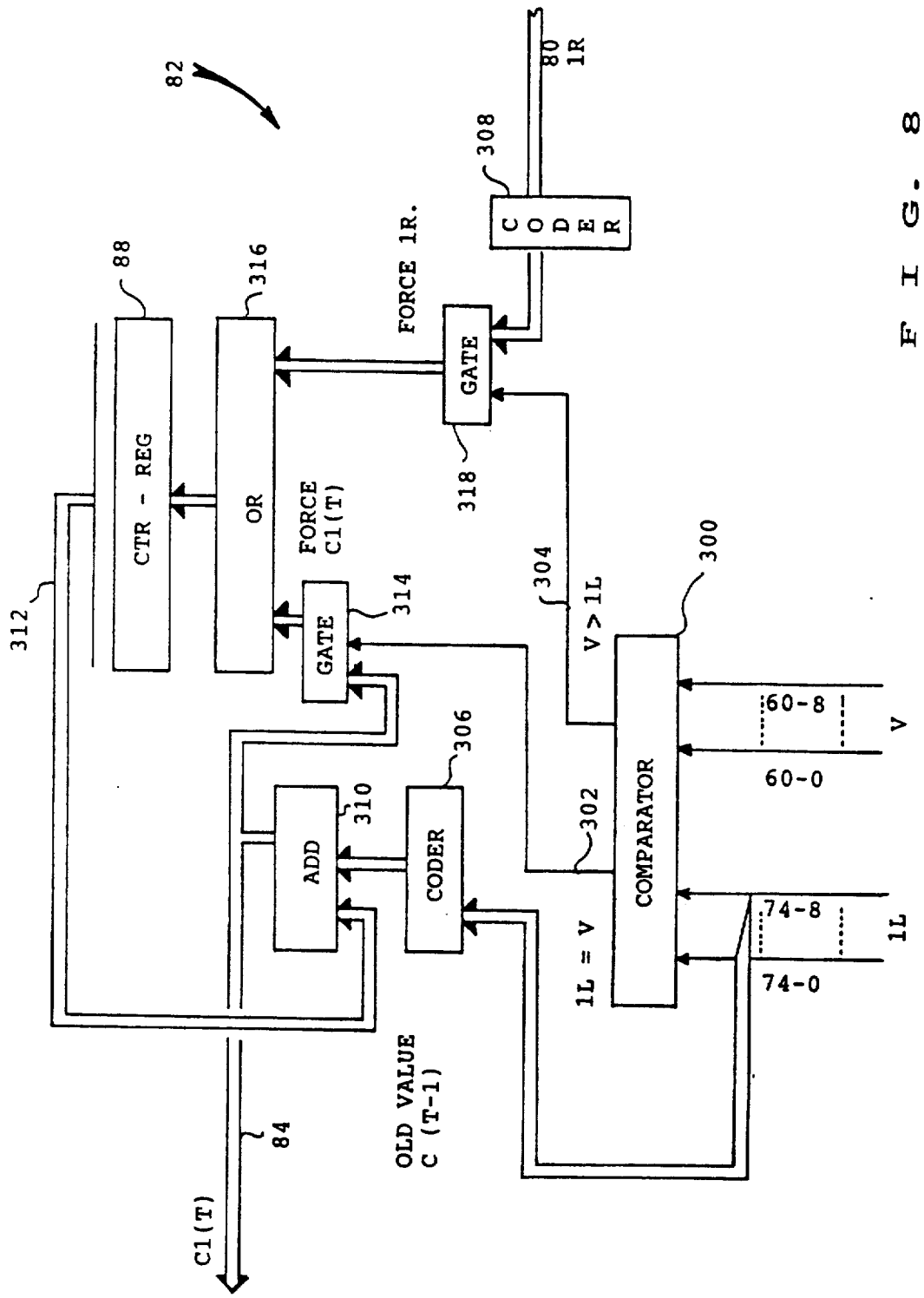
FIG. 8 shows the detailed representation of logic circuit 82 which calculates the C1(T) number.

FIG. 8 represents circuit 82 which is used for generating count C1(T), during each time interval T.

Comparator 300 compares the number 1L with V and generates an active signal on line 302 when V=1L and an active signal on line 304 when V>1L.

Coder 306 transforms the signal on one of the lines of bus 74 into a binary representation of the number 1L. In the same way, coder 308 transforms the signal on one of the lines of bus 80 into a binary representation of the binary number 1R.

Adder 310 adds the binary number 1L with the old value C(T−1) contained in register 88 and provided to adder 310 through bus 312. The number provided by adder 310 on its output bus 84 is the count C1(T) of consecutive ones in the bit stream, found during the processing of the valid received bits in interval T.

If line 302 is activated (V=1L), gate 314 provides the count C1(T) into register 88 through OR gate 316. If line 304 is activated (V>1L), gate 318 provides the binary value of 1R into register 88 though OR gate 316.

Figure 9:
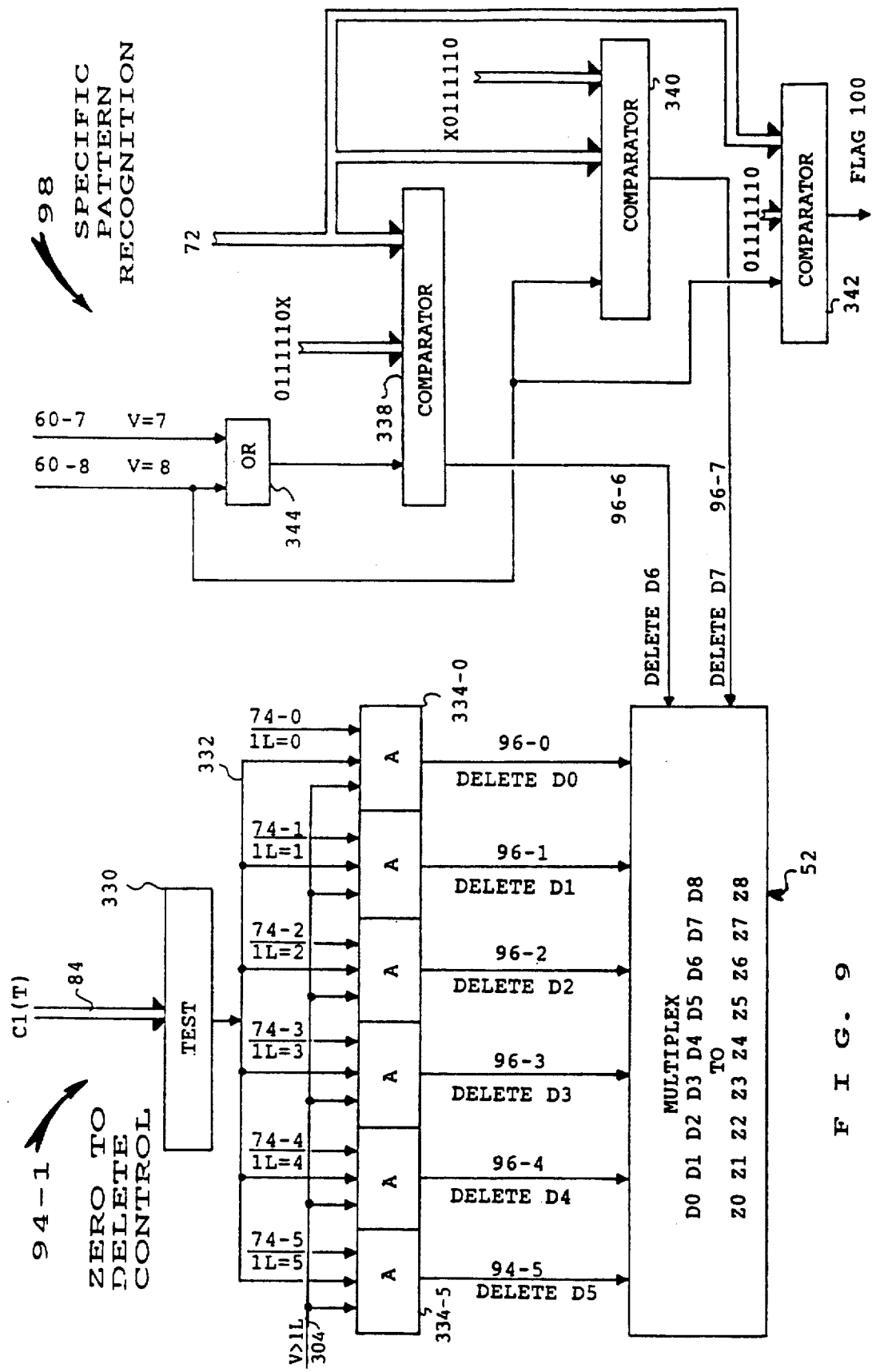
FIG. 9 shows the detailed representation of the zero to delete control circuit 94-1 of FIG. 4 and of specific patterns detection circuit 98.

FIG. 9 shows a detailed representation of the part 1 of circuit 94 which generates the Zero to delete indications and also shows multiplex circuit 52 and specific pattern recognition circuit 98 (FIG. 4).

Count C1(T) on bus 84 is provided to test circuit 330, which generates an active signal on its output line 332 when C1(T) is found equal to 5. Six AND gates 332-0 to 334-5 are conditioned by the active signal on line 332 and by the active signal on line 304 (V>1L) to provide a signal on their output lines 96-0 to 96-5 indicative of the position of the zero bit to be deleted, depending upon the value of 1L. To do this, lines 74-0 to 74-5 are connected to the inputs of AND gates 334-0 to 334-5 respectively.

For example, C1(T)=5 and 1L=5 means that bit D5 is a zero following five consecutive ones, which has to be deleted, if V is higher than 1L. In that case, line 94-5 is activated and multiplex circuit 52, causes D0 to D4 to be provided into Z0 to Z4 and D6 to D8 to be provided into Z5 to Z7 and a 0 to be entered into Z8, to delete the zero following the five consecutive ones.

If V is equal to 1L, count C1(T)=5 will be stored in register 88, and if during the next time interval T+1, 1L is found equal to 0, meaning that a zero has to be deleted after five consecutive ones (assuming V>0), AND gate 334 will provide an active signal to delete the zero bit in the D0 position by means of multiplex circuit 52.

Circuit 98 comprises three comparators 338, 340 and 342. The first comparator 338 is activated when V=7 or V=8 valid bits are received in interval T, through the signal from OR gate 344, the inputs of which are connected to lines 60-7 and 60-8. It compares the content of register 66 provided to comparator 338 through bus 72 with the specific configuration 0111110x, (where x means don't care) to generate an active signal on its output line 96-6 when the content of register 66 matches with the specific configuration, indicating that the zero in D6 position is to be deleted. The first zero of the specific configuration is deleted, if required, under the control of the signal on line 96-0, as described previously.

Comparator 340 is activated when V=8 valid bits are received to be processed in interval T, to compare the content of register 66 provided to comparator 340 through bus 72 with the specific configuration x0111110, to generate an active signal on line 96-o.when the content of register 66 matches with the specific configuration, indicating that the zero in D7 position has to be deleted.

Comparator 342 is activated when V=8 valid bits are received to be processed in interval T, to compare the content of register 66 provided to comparator 342 through bus 72, with the specific flag configuration 01111110 to activate the comparator output line 100 when a match is found.

Figure 10:
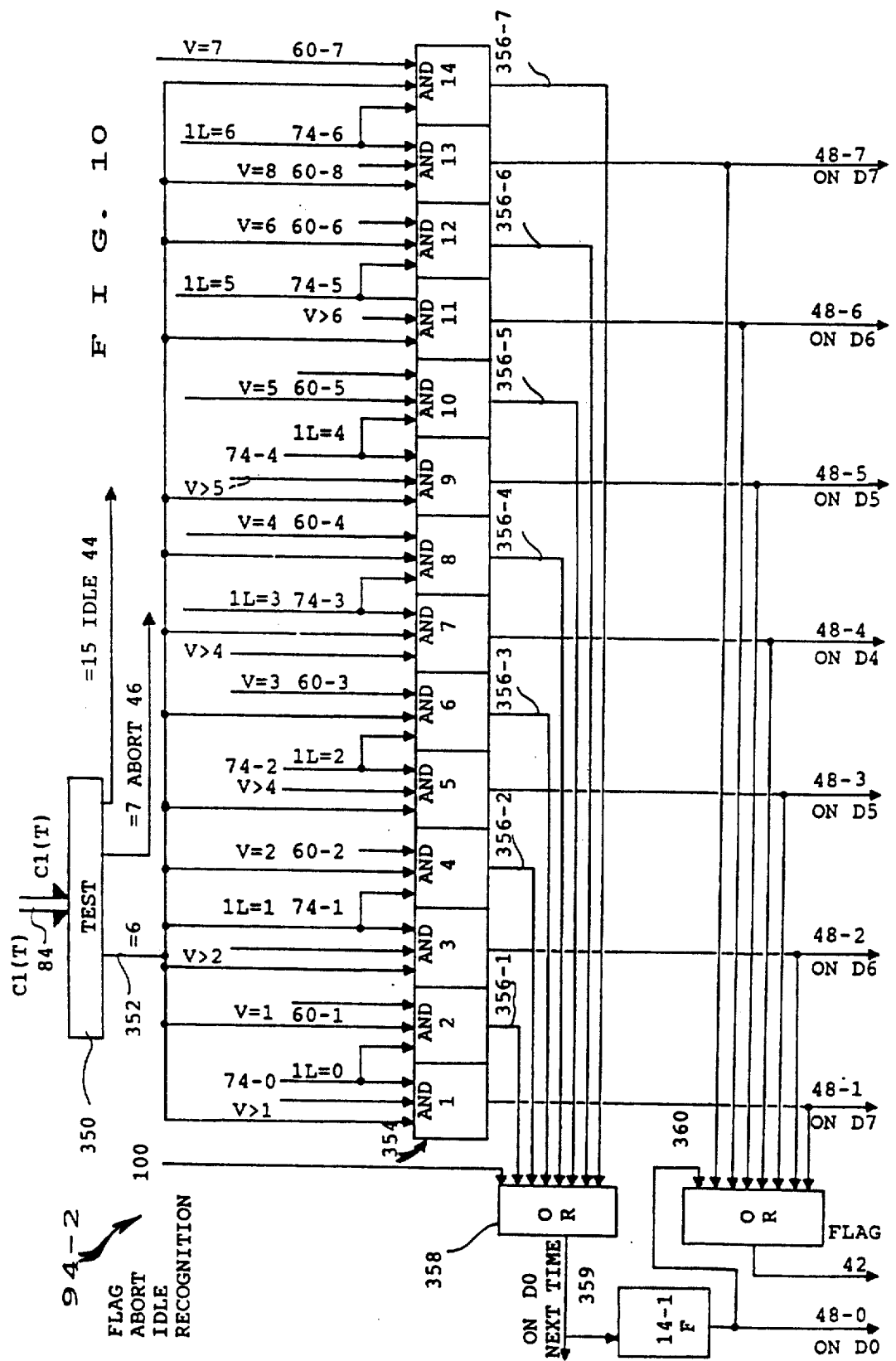
FIG. 10 shows the detailed representation of part 94-2 of flag, abort, idle and new frame boundary detection circuit 94 of FIG. 4.

FIG. 10 shows a detailed representation of the flag, abort and idle recognition part 2 of circuit 94 of figure 4.

Count C1(T) from bus 84 is provided to test circuit 350 which generates an active signal on its output line 44 when the count is found equal to 15 (idle configuration), and an active signal on its output line 46 when the count is found equal to 7 (abort configuration).

It also generates an active signal on its output line 352 when the count C1(T) is found equal to 6. In that case, it has to be checked whether the flag line 42 is to be activated and the position of the new frame boundary has to be located.

An assembly 354 of fourteen AND gates 354-1 to 354-14, is responsive to the values 1L and to the number V of valid bits to generate active signals on lines 48-1 to 48-7 indicative of the positions D1 to D7, on which the new frame starts if a flag is detected. It also generates signals on lines 356-1 to 356-7 indicative that the new frame starts on the position D0 which will contain a bit d0 to be processed during the next time interval T+1, this is also the case when the flag line 100 is activated by circuit 98.

Line 352 is provided to all AND gates in assembly 354, which are thus all conditioned when C1(T)=6.

AND gate 354-1 provides an active signal on its output line 48-1 when line 74-0 is activated, i.e. when 1L=0 and when V is found higher than 1. These conditions mean that a new frame starts on the bit contained in position D1.

AND gate 354-2 provides an active signal on its output line 356-1 when line 74-0 is activated, i.e. when 1L=0 and when V is found equal to 1. These conditions mean that a new frame starts on the bit which will be contained in position D0, during the next interval T+1.

AND gate 354-3 provides an active signal on its output line 48-2 when line 74-1 is activated, i.e. when 1L=1 and when V is found higher than 2. These conditions mean that a new frame starts on the bit contained in position D2.

AND gate 354-4 provides an active signal on its output line 356-2 when line 74-1 is activated, i.e. when 1L=1 and when V is found equal to 2. These conditions mean that a new frame starts on the bit which will be contained in position D0, during the next interval T+1.

AND gate 354-5 provides an active signal on its output line 48-3 when line 74-2 is activated, i.e. when 1L=2 and when V is found higher than 3. These conditions mean that a new frame starts on the bit contained in position D3.

AND gate 354-6 provides an active signal on its output line 356-3 when line 74-2 is activated, i.e. when 1L=2 and when V is found equal to 3. These conditions mean that a new frame starts on the bit which will be contained in position D0, during the next interval T+1.

AND gate 354-7 provides an active signal on its output line 48-4 when line 74-3 is activated, i.e. when 1L=3 and when V is found higher than 4. These conditions mean that a new frame starts on the bit contained in position D4.

AND gate 354-8 provides an active signal on its output line 356-4 when line 74-3 is activated, i.e. when 1L=3 and when V is found equal to 4. These conditions mean that a new frame starts on the bit which will be contained in position D0, during the next interval T+1.

AND gate 354-9 provides an active signal on its output line 48-5 when line 74-4 is activated, i.e. when 1L=4 and when V is found higher than 5. These conditions mean that a new frame starts on the bit contained in position D5.

AND gate 354-10 provides an active signal on its output line 356-5 when line 74-4 is activated, i.e. when 1L=4 and when V is found equal to 5. These conditions mean that a new frame starts on the bit which will be contained in position D0, during the next interval T+1.

AND gate 354-11 provides an active signal on its output line 48-6 when line 74-5 is activated, i.e. when 1L=5 and when V is found higher than 6. These conditions mean that a new frame starts on the bit contained in position D6.

AND gate 354-12 provides an active signal on its output line 356-6 when line 74-5 is activated, i.e. when 1L=5 and when V is found equal to 6. These conditions mean that a new frame starts on the bit which will be contained in position D0, during the next interval T+1.

AND gate 354-13 provides an active signal on its output line 48-7 when line 74-6 is activated, i.e. when 1L=6 and when V is found higher than 7 i.e. V=8. These conditions mean that a new frame starts on the bit contained in position D7.

AND gate 354-14 provides an active signal on its output line 356-7 when line 74-6 is activated, i.e. when 1L=6 and when V is found equal to 7. These conditions mean that a new frame starts on the bit which will be contained in position D0, during the next interval T+1.

The signals activated when V higher than 1, 2, 3, 4, 5, 6 may be easily obtained from the output signals of variable delimiter detection circuit on lines 60-0 to 60-8.

Lines 356-1 to 356-7 are provided to OR gate 358 together with line 100, which thus generates an active signal on its output line 359 indicating that the new frame will begin on the bit contained in D0 during the next time interval, this information is stored in a specific stage F of register position 14-1, to be used as an indication of the start of a new frame on D0 on line 48-0.

Lines 48-0 to 48-7 are provided to OR gate 360, the output line which is the flag line 42.

Figure 11:
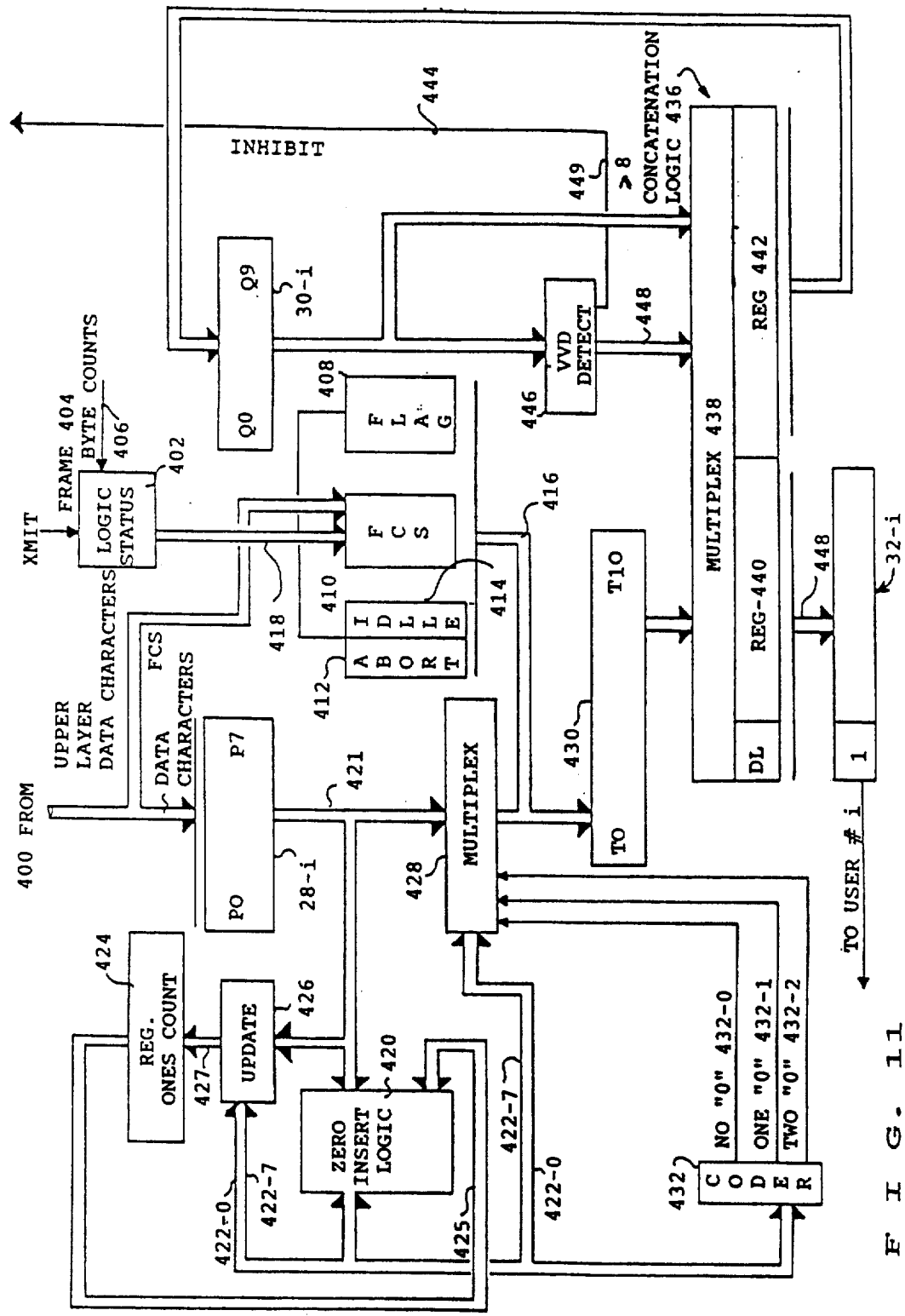
FIG. 11 shows the transmit part of the character service function device 8.

It will now be described in reference to FIG. 11, the transmit part of the parallel processor 10. It is assumed that FIG. 11, shows the parallel processor when operating with user i.

The transmit part is simpler than the receive part, since the number of valid bits which are to be sent at each slot offering is known. It will be assumed that at each slot 8 valid bits may be sent. Thus, the most left position of data out register 32-i has always to be set to 1, to indicate that the slot contains 8 valid bits.

The data characters of the frame to be sent are received from the upper layer, into 8 bit-register 28-i through bus 400. The functions of the parallel processor is to insert a zero after five consecutive data ones, to send the specific configurations: flags, idle and abort, and to fill the register 32-i with eight valid bits which may be serially sent on the user line.

Finite state machine 402 is responsive to a transmit frame command XMIT FRAME on line 404 and to a byte count indication on bus 406 from the line scanning means to generate the commands required for building the frames to be sent.

Register 408 contains the flag configuration 01111110, register 410 stores the FCS (frame check sequence) bytes received from the upper layer after the data characters and registers 412 and 414 store the abort and idle configurations to be sent on the line when required. The contents of registers 408, 410, 412 and 414 are gated on bus 416 at appropriate times under control of signals from the finite state machine 402, on control lines of bus 418.

The data characters stored into positions P0 to P7 of register 28-i are provided to zero insert logic 420 through bus 421, logic 420 generates zero insert signals on the lines 422-0 to 422-7 of bus 422, which are activated as a function of the bit values of the character contained in P0 to P7, and as a function of the value stored into one's count register 424 provided to logic 420 through bus 425, as will be explained later on. At each successive character stored into register 28-i, the one's count to be stored into register 424 is updated through update logic circuit 426 as a function of the signals on bus 422 and on bus 421.

An active signal on line 422-0 of bus 422 indicates that a 0 is to be inserted before the bit contained in P0 and a signal on line 422-7 of bus 422 indicates that a 0 is to be inserted between the bits contained in P6 and P7. Bus 422 is provided to multiplex circuit 428 which gates the content of register 28-i with 0 inserted at the right positions as indicated by the active signals on the lines of bus 422, into register 430 which comprises eleven stages, T0 to T10.

Register 430 comprises eleven stages as the maximum number of zeroes to be inserted in an eight bit pattern, is equal to 2 and a variable delimiter to indicate whether said register 430 comprise 8, 9 or 10 valid bits.

The variable delimitation pattern is set into register 430 through multiplex circuit 428 as a function of the number of zeroes to be inserted which is provided by coder circuit 432, which provides an active signal on line 432-0 when no zero is to be inserted, on line 432-1 when one zero is to be inserted and on line 432-2 when two zeroes are to be inserted.

For example, assuming that signal on line 432-0 is active the content of positions T0 to T10 will be:

P0 P1 P2 P3 P4 P5 P6 P7 1 0 0

If signal on line 432-1 is active, and that signal on line 422-5 is active, the content of positions T0 to T10 will be:

P0 P1 P2 P3 P4 0 P5 P6 P7 1 0

Concatenation logic 436 which comprises multiplexing circuit 438 and registers 440 and 442, allows the slot configuration to be stored into register 32-i at each slot offering. The most left positions of register 440 are set to the variable delimiter configuration DL which depends on the number of valid bits in the user slot. Assuming that eight bits may be sent in a slot, register 440 comprises nine stages and the most left bit DL in register 440 is set to 1.

Register 442 is the overflow register containing the valid bits which cannot be sent during the slot offering and which are stored into register 30-i to be sent at the next slot, so that content of register 442 is sent to register 30-i through bus 444. The variable delimiting configuration in register 430, is located at the left of register 442, so that it may be used to indicate the number of valid residual bits in register 30-i.

This number of valid residual bits is detected by circuit 446, which generates control signals on its output bus 448 which control multiplex circuit 438 to gate the content of register 30-i at the right positions at each slot offering.

If more than eight residual bits are detected an inhibit signal is generated on line 449, which prevents a new byte from being provided by the upper layer, into register 28-i.

A variable length delimiter configuration is appended to the flag, the FCS and the specific configurations to meet the same requirements as the character bits.

The content of register 440 is provided to register 32-i through bus 448 to be sent on the user line.

Figure 12:
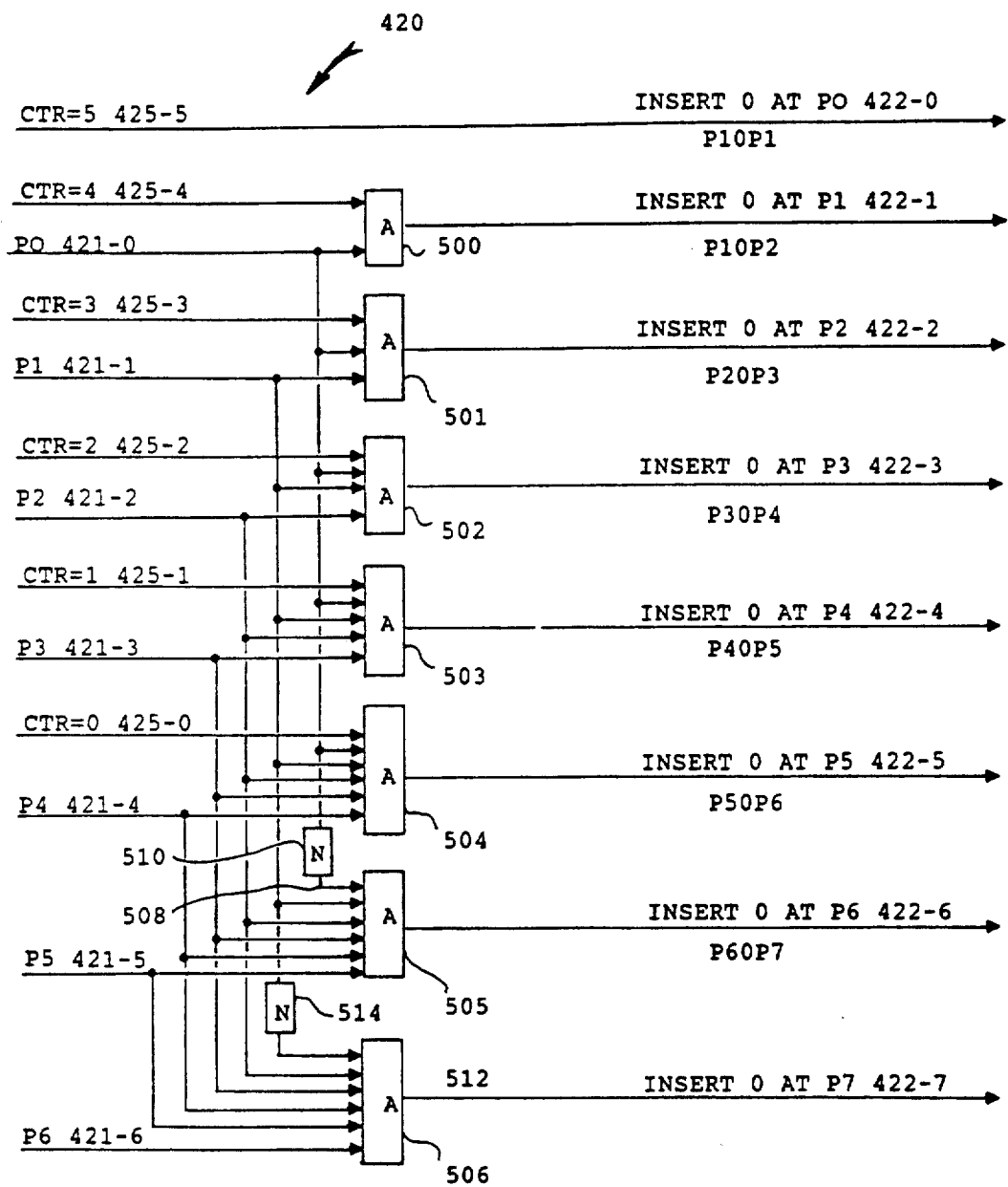
FIG. 12 shows the detailed representation of the zero insertion logic circuit 420 of FIG. 11.

FIG. 12 shows the zero insertion logic circuit 420. It comprises seven AND gates 500 to 506 which are responsive to values of the bits contained in register 28-i and to the one's count value set into register 424 at the previous sending period.

Register 424 is a six position register, each position storing a one's count value, so as to provide an active signal on one line of bus 425, an active signal on line 425-0 is indicative of a one's count equal to 0 and an active signal on line 425-5 is indicative of a one's count equal to 5.

If line 425-5 is active, a 0 is to be inserted before the bit at position P0, thus the active signal on line 425-5 is the signal INSERT 0 at P0 on line 422-0.

The input lines of AND gate 500 are lines 425-4 and 421-0, and its output line is the INSERT 0 at P1 line 422-1. AND gate 500 provides an active signal on its output line 422-1 if the one's count is equal to 4 and if the bit contained in position P0 is at 1, meaning that a 0 is to be inserted between the bits contained in P0 and P1.

The input lines of AND gate 501 are lines 425-3, line 421-0 and line 421-1 and its output line is the INSERT 0 at P2 line 422-2. AND gate 501 provides an active signal on its output line 422-2, if the one's count is equal to 3 and if the bits contained in positions P0 and P1 are at 1L meaning that a 0 is to be inserted between the bits contained in P1 and P2.

The input lines of AND gate 502 are lines 425-2, lines 421-0 421-1 and 421-2 and its output line is the INSERT 0 at P3 422-3. AND gate 502 provides an active signal on its output line 422-3, if the one's count is equal to 2 and if the bits contained in P0, P1 and P2 are at 1, meaning that a 0 is to be inserted between the bits contained in P2 and P3.

The input lines of AND gate 503 are lines 425-1, lines 421-0, 421-1, 421-2, 421-3 and its output line is the INSERT 0 at P4 line 422-4. AND gate 503 provides an active signal on its output line 422-4, if the one's count is equal to 1 and if the bits contained in positions P0, P1, P2 and P3 are at 1, meaning that a 0 is to be inserted between the bits contained in P3 and P4.

The input lines of AND gate 504 are lines 425-0, lines 421-0 421-1, 421-2, 421-3, 421-4 and its output line is the INSERT 0 at P5 422-5. AND gate 504 provides an active signal on its output line 422-5, if the the one's count is equal to 0 and if the bits contained in P0, P1, P2, P3 and P4 are at 1, meaning that a 0 is to be inserted between the bits contained in P4 and P5.

The input lines of AND gate 505 are the output line 508 of inverter 510 which inverts the signal on line 421-0, lines 421-1, 421-2, 421-3, 421-4 and 421-5, so that it provides an active signal on its INSERT 0 at P6 line 422-6 when, the bit in position P0 is at 0 and bits in positions P1, P2, P3, P4 and P5 are at 1, meaning that a 0 is to be inserted between P5 and P6.

The input lines of AND gate 506 are the output line 512 of inverter 514 which inverts the signal on line 421-1, lines 421-2, 421-3, 421-4, 421-5 and 421-6, so that it provides an active signal on its INSERT 0 at P7 line 422-7 when, the bit in position P1 is at 0 and bits in positions P2, P3, P4, P5 and P6 are at 1, meaning that a 0 is to be inserted between P6 and P7.

FIG. 13 shows the updating logic circuit 426, which is responsive to the INSERT 0 at Px signals Ix (with $x = 7, 6, 5, 4$ and 3) on lines 422-7, 422-6, 422-5, 422-4 and 422-3 and to the bits contained in P7, P6, P5, P4 and P3 and to the inverted values of these bits provided through inverters 520, 522, 524, 526 and 528. It: comprises AND, OR and inverter circuits 530, 532, 534, 536, 538 and 540 which generates SET at "k" signals on the lines 427-0 to 427-5 (with $k = 0, 1, 2, 3, 4, 5$)

The signal SET at 0 is activated by inverter circuit 530 when P7 is at 0.

The signal SET at 1 is activated by AND-OR circuit 532 when the following conditions are met:

|  | I7 = 1 AND P7 = 1 |
| --- | --- |
| OR | I6 = 1 AND P7 = 1 AND P6 = 0 |
| OR | I5 = 1 AND P7 = 1 AND P6 = P5 = 0 |
| OR | I4 = 1 AND P7 = 1 AND P6 = P5 = P4 = 0 |
| OR | I3 = 1 AND P7 = 1 AND P6 = P5 = P4 = P3 = 0 |

Circuit 534 activates the SET at 2 line 427-2 when the following conditions are met:

|  | I6 = 1 AND P7 = P6 = 1 |
| --- | --- |
| OR | I5 = 1 AND P7 = P6 = 1 AND P5 = 0 |
| OR | I4 = 1 AND P7 = P6 = 1 AND P5 = P4 = 0 |
| OR | I3 = 1 AND P7 = P6 = 1 AND P5 = P4 = P3 = 0 |

Circuit 536 activates the SET at 3 line 427-3 when the following conditions are met:

|  | I4 = 1 AND P7 = P6 = P5 AND P4 = 0 |
| --- | --- |
| OR | I3 = 1 AND P7 = P6 = P5 = 1 AND P4 = P3 = 0 |

Circuit 538 activates the SET at 4 line 427-4 when the following conditions are met:

|  | I4 = 1 AND P7 = P6 = P5 = P4 = 1 |
| --- | --- |
| OR | I3 = 1 AND P7 = P6 = P5 = P4 = 1 AND P3 = 0 |

AND circuit 540 provides an active SET at 5 signal on line 427-5 when $P7 = P6 = P5 = P4 = P3 = 1$.

The details of these logic circuits are not shown in FIG. 13, since they may be easily designed by the man skilled in the art, from the knowledge of the logic functions they have to perform, which are indicated previously and in FIG. 13.

Figure 14:
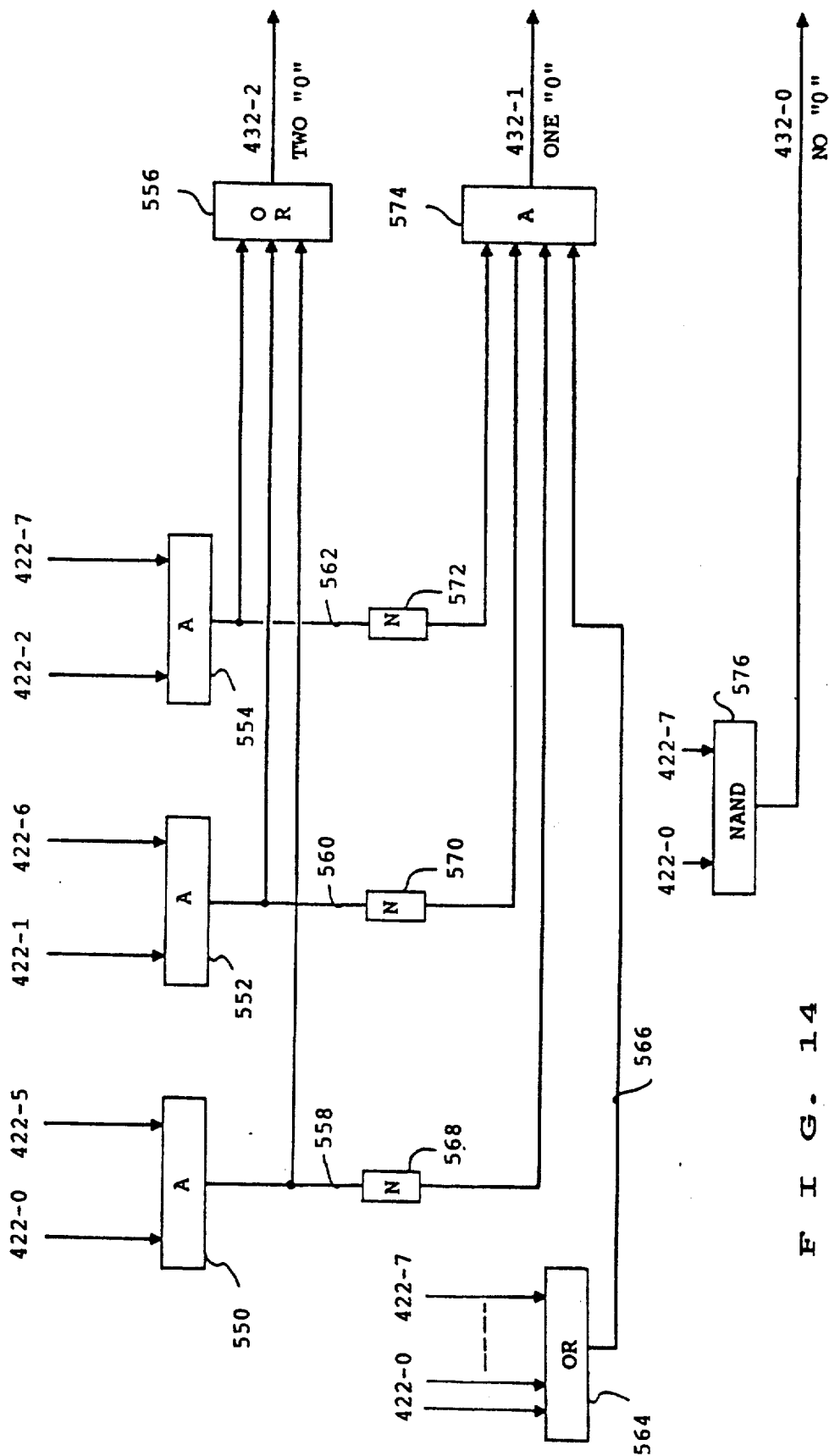
FIG. 14 shows the detailed representation of coder circuit 432 of FIG. 11.

Coder 432 is shown in FIG. 14. It comprises three AND gates 550, 552 and 554 and OR gate 556 which generates the TWO "0" inserted signals on line 432-0. AND gate 550 provides an active signal on its output line 558 when lines 422-0 and 422-5 are activated. AND gate 552 provides an active signal on its output line 560 when lines 422-1 and 422-6 are activated. AND gate 554 provides an active signal on its output line 562 when lines 422-2 and 422-7 are activated. The output lines 558, 560 and 562 are provided to the inputs of OR gate 556.

Lines 422-0 to 422-7 are provided to OR gate 564, which thus provides an active signal on its output line 566 when at least one of said lines is activated. Lines 558, 560 and 562 are provided to inverters 568, 570 and 572, the output lines of which are provided together with line 566 to AND gate 574 which thus provides an active signal on its output line 432-1 when only one line among lines 422-0 to 422-7 is activated.

Lines 422-0 to 422-7 are provided to NAND gate 576 which provides an active signal on its output line 432-0 when none among lines 422-0 to 422-7 is activated.

These lines 432-0, 432-1 and 432-2 are provided together with lines 422-0 to 422-7 to multiplexing circuit 428 to control the gating of the content of register 28-i with the appropriate delimiting configuration into register 430.

The invention has been described in details, assuming a maximum number equal to 8 bits are processed in parallel. It will be easy for a man skill in the art, to extend the processing capability to a greater number of bits. This will imply in the receiving part to take into account the greater number of specific patterns which may happen in a greater number of bits. This may be done either by extending the capability of circuit 98 or by partitioning the bits received in one slot into parts which may be processed in parallel.

Furthermore, any counting means may be used to indicate the numbers of valid bits in registers 12-1, 14-1, 112, 430 instead of the variable delimiter pattern detection circuits. However, such circuits are easy to implement and present a significant advantage over other more conventional circuits.

We claim:

1. Method for processing bit streams from at least one user, when said bit streams are split into time slots assigned to the user on a serial link transporting frames delimited by flags having a specific bit pattern comprising a number f (=6) of bits at a first value (1) between two bits at a second value (0), an information bit block in which bits at the second value are inserted after f−1 bits at the first value, which have to be deleted to retrieve the information block content, characterized in that it comprises the steps of:

for each bit stream, receiving the incoming bits serially from the user and for each time slot assigned to the user assembling n consecutive bits in a time interval T with said n consecutive bits being processed in parallel, computing the number 1L of consecutive bits at the first value in the n bits, beginning from the least significant bit and proceeding in a direction of the most significant bit, computing the number 1R of consecutive bits at the first valve in the n bits, beginning from the most significant bit and proceeding in a direction of the least significant, comparing 1L with n and computing the current number C1 (T) of consecutive bits at the first value in the bit stream as follows:

if n>1L, the C1 (T)=1L+C(T−1)

and C(T)=1R if n=1L=1R, then C1 (T)=1L+C(T−1)

and C(T)=C1(T)

where C(T) is the number to be added to 1L in the next time interval (T+1) to compute C1 (T+1) and C(T−1) is the number calculated during the previous time interval T, when n is higher than f, checking whether the bits between the most left bit and the most right bit at the second value comprise f or F−1 consecutive bits set at the first value to provide specific pattern indications indicative that the n-bits comprise specific information bit patterns comprising more than one bit to be deleted or a flag pattern, determining from the C1(T) and 1L values and from the specific pattern indications if any, at which positions, bits at the second value have to be deleted and whether a flag has been received, deleting the bits at the determined positions, and assembling N-bit character is from the bits received and processed in at least one interval T, with N higher or equal to n.

2. Method for transmitting N-bit character streams transporting frames to users, said frames being delimited by flags having a specific bit pattern comprising a number f (=6) of bits at a first value (1) between two bits at a second value (0), an information bit block in which bits at the second value are inserted after f−1 bits at the first value, characterized in that it comprises the steps of:

processing the N-bit character is of the frames in successive time intervals assigned to the user, in such a way that in each time interval T, except when the flag is to be processed, a variable number x of insertions of bits at the second value are performed after f−1 bits at the first value said variable number depending upon the values of the character bits and of a count of bits at the first value calculated during the processing of the character in the previous time interval, said count being comprised between 0 and f−1 depending upon the values of the bits of the characer processed during the previous time interval, sending a given number of n bits during each time interval T, which comprises r(T) residual bits kept from the previous interval plus n(T) bits taken from the character processed in this time interval such that r(T)+n(T)=n and keeping the r(T+1) bits=N+x−n(T), which overflow the n-bit sending capability, to be sent as residual bits during the next period T+1.

3. Device for receiving bit streams from at least one user when said bit streams are split into time slots assigned to the user on a serial link for transporting frames delimited by flags having a specific bit pattern comprising a number f (=6) of bits at a first value (b 1) between two bits at a second value (0), an information bit block in which bits at the second value are inserted after f−1 bits at the first value, which have to be deleted to retrieve the information block content, characterized in that it comprises:

first register means (12) for receiving the serial incoming bits streams from the user and for each time slot assigned to the user assembling n consecutive bits therefrom, parallel processing means (10) comprising:

first computing means (66, 72) for calculating the number 1L of consecutive bits at the first value in the n bits beginning from the least recently received bit and proceeding in a direction towards the most signficant bit, second computing means (68, 76) for calculating the number 1R of consecutive bits at the first value beginning from the most recently received signficant bit and proceeding in a direction towards the least significant bit, third computing means (82) for calculating the current number C1(T) of consecutive bits at the first value in the bit stream by comparing n with 1L and making:

$$C1(T) = 1L + C(T-1)$$

and $C(T) = 1R$ if $n > 1L$ or $C(T) = C1(T)$ if $n = 1L$ where C(T) is the number to be added to 1L in the next time interval T+1 to calculate C1(T−1) and C(T−1) is the number calculated during the previous interval T−1.

specific pattern detection means (98) which are active when n is higher than f and are responsive to the n-bit pattern stored in the first register means to check whether the bits between the most left bit at the second value and the most right bit at the second value comprises f or f−1 consecutive bits at the first value to provide signals indicative that the n-bit pattern is a specific pattern such as a flag or comprises more than one bit at the second value to be deleted, control means (94, 52) responsive to the C1(T) and 1L values and to the signals indicative of the reception of specific patterns if any, for generating control signals indicative of the bits at the second value which have to be deleted and of the reception of a flag, second register means (16), concatenation means (54) for concatenating residual bits kept from the previous processing time interval T−1 and from the bits processed during the current interval T and assembling a N-bit character therefrom to be stored in the second register means (16), third register means (14) for storing the residual bits comprising the concatenated bits which overflow the N-bit character or the concatenated bits as a whole when their number is lower than n.

4. Device according to claim 3 characterized in that the control means comprise first logic circuit (330,334) having f first bit deletion control output lines and being responsive to the C1(T) value equal to f−1 and to the 1L value for activating one line among the f output lines which indicates the position of the first bit to be deleted in the n-bit pattern.

5. Device according to claim 4 characterized in that the specific pattern detection means (98) have additional bit deletion control output lines and comprise first comparing means (338,240) comparing the n-bit pattern with specific information bit patterns comprising all the combinations of bits which may have more than one bit at the second level to be deleted and activating the required additional bit deletion control output lines depending upon which coincidences are detected for controlling the deletion of the additional bits at the second level in the n-bit pattern.

6. Device according to claim 5 characterized in that the specific pattern detection means (98) comprise second comparing means (342) comparing the n-bit pattern with the flag pattern for generating a first flag detection output signal when a coincidence is detected.

7. Device according to claim 6 characterized in that the control means (94, 52) comprise:

comparing means (350) providing a second flag detection output signal when C1(T) is found equal to f, a second logic circuit (354,360) responsive to the first and second flag detection output signals for generating a frame flag detection signal and a start of new frame signal indicative of the position of the bit in the n-bit pattern which starts the frame.

8. Device according to claim 7 characterized in that the control means comprise:

multiplexing means (52) responsive to the first bit deletion control signals, to the additional bit deletion control signals and to the start of new frame signal to gate the n-bit pattern wherein the bits at the second level have been deleted, when required, together with an indication of the number (n−d) of bits remaining after the bit deletion, to the concatenation logic.

9. Device according to claim 8 characterized in that the concatenation logic comprises, concatenating register means (112), first gating means (108,110) for providing the residual bits from the third register means (14) and the bits from the multiplexing means together with the indication of the number (n−d) into the concatenating register means (112), means (116) responsive to the indication of the number (n−d) of bits remaining after the bit deletion, and to an indication of the number r(T−1) of residual bits contained in the third register (14) to detect whether the concatenation register means (112) contains more than N concatenated bits or not, and generating therefrom a first or a second gating signal respectively, second gating means (126, 124) which are responsive to the first gating signal to transfer N-bits from the concatenated bits into the second register means, and the residual bits which overflow the N-bit capacity into the third register means (14) together with the indication of the number r(T) of residual bits to be processed during next time interval (T+1), third gating means (130) which are responsive to the second gating signal to transfer the concatenated bits into the second register means, which constitute the residual bits, together with an indication of their number r(T).

10. Device according to any one of claims 3 to 7 characterized in that the number n of bits may be variable.

11. Device for transmitting N-bit character streams transporting frames to a user said frames delimited by flags having a specific bit pattern comprising a number f (=6) of bits at a first value (1) between two bits at a second value (0), an information block in which bits at the second value are inserted after f−1 bits at the first value, characterized in that it comprises:

first registers means (28) for storing the successive N-bit frame characters, each character being processed during a time interval T assigned to the user, second register means (424) for storing a count of bits at the first value calculated during the previous time interval T−1, a first logic circuit (420) which is responsive to the first and second register contents to generate insertion control signals which are indicative of the positions at which bit at the second level have to be inserted, a second logic circuit (426) which is responsive to the first register content and to the insertion control signals to store into the second register means the count of bits at the first value to be taken into account during the next interval (T+1), buffering means (430), output register means (440,32), residual bit register means (30), first multiplexing means (428) which are responsive to the insertion control signals for gating the N-bit character with bits at the second level inserted when required, into the buffering means together with an indication of the number of bits stored into the buffering means, a concatenation logic (436) receiving the residual bits from the residual bit register means (30) to which the bits from the buffering means are concatenated, and which provide n-bits to the output register means and the residual bits into the residual bit register means.

* * * * *